(12) United States Patent
Zhamu et al.

(10) Patent No.: US 9,382,117 B2
(45) Date of Patent: Jul. 5, 2016

(54) PROCESS FOR PRODUCING HIGHLY CONDUCTING GRAPHITIC FILMS FROM GRAPHENE LIQUID CRYSTALS

(71) Applicants: Aruna Zhamu, Springboro, OH (US); Bor Z Jang, Centerville, OH (US)

(72) Inventors: Aruna Zhamu, Springboro, OH (US); Bor Z Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 198 days.

(21) Appl. No.: 13/999,912

(22) Filed: Apr. 3, 2014

(65) Prior Publication Data

US 2015/0284253 A1    Oct. 8, 2015

(51) Int. Cl.
*C01B 31/02*    (2006.01)
*C01B 31/04*    (2006.01)

(52) U.S. Cl.
CPC ........... *C01B 31/0446* (2013.01); *C01B 31/043* (2013.01); *C01B 31/0438* (2013.01); *C01B 31/0476* (2013.01); *C01B 2204/22* (2013.01); *C01P 2006/10* (2013.01)

(58) Field of Classification Search
CPC ..... C01B 31/0446; B05D 3/12; B05D 3/0254
See application file for complete search history.

(56) References Cited

U.S. PATENT DOCUMENTS

| | | | |
|---|---|---|---|
| 7,071,258 B1 | 7/2006 | Jang et al. | |
| 8,226,801 B2 * | 7/2012 | Zhamu | B82Y 30/00 204/157.15 |
| 2013/0162977 A1 * | 6/2013 | Jung | B82Y 30/00 356/36 |
| 2013/0236715 A1 * | 9/2013 | Zhamu | B82Y 30/00 428/220 |
| 2014/0242275 A1 * | 8/2014 | Zhamu | C01B 31/0423 427/228 |

OTHER PUBLICATIONS

G. W. Anderson, et al., J. Amer. Chem. Soc. 96, 1839, 1964.

* cited by examiner

*Primary Examiner* — Richard M Rump

(57) ABSTRACT

A process for producing a highly oriented graphitic film, consisting of (a) preparing a dispersion having graphene oxide (GO) or chemically functionalized graphene (CFG) dispersed in a liquid to form a liquid crystal phase (but not in a GO gel state); (b) depositing the dispersion onto a supporting substrate to form a layer of GO or CFG under an orientation-inducing stress; (c) removing the liquid to form a dried GO or CFG layer having an inter-plane spacing $d_{002}$ of 0.4 nm to 1.2 nm; (d) thermally reducing the dried layer at a first temperature higher than 100° C. to produce a porous layer of reduced GO or CFG; (e) further heat-treating the porous layer at a second temperature to produce a porous graphitic film having an inter-plane spacing $d_{002}$ less than 0.4 nm; and (f) compressing the porous graphitic film to produce the highly oriented graphitic film.

33 Claims, 14 Drawing Sheets

20 µm (50 μm wide)

PROCESS FOR PRODUCING HIGHLY CONDUCTING GRAPHITIC FILMS FROM GRAPHENE LIQUID CRYSTALS

FIELD OF THE INVENTION

The present invention relates generally to the field of graphitic materials and, more particularly, to a process for producing a highly oriented graphitic film. This new graphene liquid crystal-derived thin-film material exhibits an unprecedented combination of exceptionally high thermal conductivity, high electrical conductivity, high elastic modulus, and high tensile strength.

BACKGROUND OF THE INVENTION

Carbon is known to have five unique crystalline structures, including diamond, fullerene (0-D nano graphitic material), carbon nano-tube or carbon nano-fiber (1-D nano graphitic material), graphene (2-D nano graphitic material), and graphite (3-D graphitic material). The carbon nano-tube (CNT) refers to a tubular structure grown with a single wall or multi-wall. Carbon nano-tubes (CNTs) and carbon nano-fibers (CNFs) have a diameter on the order of a few nanometers to a few hundred nanometers. Their longitudinal, hollow structures impart unique mechanical, electrical and chemical properties to the material. The CNT or CNF is a one-dimensional nano carbon or 1-D nano graphite material.

Bulk natural graphite is a 3-D graphitic material with each graphite particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). Although all the graphene planes in one grain are parallel to one another, typically the graphene planes in one grain and the graphene planes in an adjacent grain are inclined at different orientations. In other words, the orientations of the various grains in a graphite particle typically differ from one grain to another.

A graphite single crystal (crystallite) per se is anisotropic with a property measured along a direction in the basal plane (crystallographic a- or b-axis direction) being dramatically different than if measured along the crystallographic c-axis direction (thickness direction). For instance, the thermal conductivity of a graphite single crystal can be up to approximately 1,920 W/mK (theoretical) or 1,800 W/mK (experimental) in the basal plane (crystallographic a- and b-axis directions), but that along the crystallographic c-axis direction is less than 10 W/mK (typically less than 5 W/mK). Further, the multiple grains or crystallites in a graphite particle are typically all oriented along different directions. Consequently, a natural graphite particle composed of multiple grains of different orientations exhibits an average property between these two extremes (i.e. between 5 W/mK and 1,800 W/mK).

It would be highly desirable in many applications to produce a thin graphitic structure having sufficiently large dimensions (i.e. large length and/or width) and having all graphene planes being essentially parallel to one another along one desired direction. In other words, it is highly desirable to have one large-size graphitic film (e.g. a fully integrated layer of multiple graphene planes) having the c-axis directions of all the constituent graphene planes being substantially parallel to one another and having a sufficiently large length and/or width for a particular application (e.g. 2 cm×2 cm to cover a smart phone CPU or 75 cm×75 cm to serve as a heat dissipating element for a modern flat panel display TV). Up to this point of time, it has not been possible to produce such a highly oriented graphitic film. Even though some attempts have been made to produce the so-called highly oriented pyrolytic graphite (HOPG) through tedious, energy intensive, and expensive chemical vapor deposition (CVD) followed by ultra-high temperature graphitization, the graphitic structure of the HOPG remains inadequately aligned and, hence, exhibits properties that are significantly lower than theoretically predicted.

The present invention is directed at a new materials science approach to designing and building a new class of materials herein referred to as the highly oriented graphene film (HOGF). A HOGF is a thin-film structure composed of highly aligned graphene or graphene oxide planes, wherein all of the graphene or graphene oxide planes are essentially parallel to one another. These graphene planes are much better aligned than what the conventional HOPG has been able to achieve. Such a HOGF has a thickness typically less than 200 μm, but more typically thinner than 100 μm, even more typically less than 50 μm, further more typically and preferably thinner than 25 μm. The thickness can be as small as 100 nm, but preferably at least 1 μm; thus, the most desired thickness is between 1 μm and 25 μm. In most cases, the HOGF has an oxygen amount of 0.001-5% by weight, but can be essentially oxygen-free if the HOGF is obtained from pristine graphene. The conventional HOPG contains no oxygen.

The constituent graphene planes of a graphite crystallite in a natural or artificial graphite particle can be exfoliated and extracted or isolated to obtain individual graphene sheets of carbon atoms provided the inter-planar van der Waals forces can be overcome. An isolated, individual graphene sheet of carbon atoms is commonly referred to as single-layer graphene. A stack of multiple graphene planes bonded through van der Waals forces in the thickness direction with an inter-graphene plane spacing of approximately 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nano graphene platelets" (NGPs). Graphene or graphene oxide sheets/platelets (collectively, NGPs) are a new class of carbon nano material (a 2-D nano carbon) that is distinct from the 0-D fullerene, the 1-D CNT, and the 3-D graphite.

Our research group pioneered the development of pristine graphene materials, isolated graphene oxide sheets, and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004); and (3) B. Z. Jang, A. Zhamu, and J. Guo, "Process for Producing Nano-scaled Platelets and Nanocomposites," U.S. patent application Ser. No. 11/509,424 (Aug. 25, 2006). Historically, Brodie first demonstrated the synthesis of graphite oxide in 1859 by adding a portion of potassium chlorate to a slurry of graphite in fuming nitric acid. In 1898, Staudenmaier improved on this procedure by using concentrated sulfuric acid as well as fuming nitric acid and adding the chlorate in multiple aliquots over the course of the reaction. This small change in the procedure made the production of highly oxidized graphite in a single reaction vessel significantly more practical. In 1958, Hummers reported the method most commonly used today: the graphite is oxidized by treatment with $KMnO_4$ and $NaNO_3$ in concentrated $H_2SO_4$. However, these earlier work failed to isolate and identify fully exfoliated and separated graphene oxide sheets. These studies also failed to disclose the isolation of pristine, non-oxidized single-layer or multiple-layer graphene sheets.

In real practice, NGPs are typically obtained by intercalating or oxidizing natural graphite particles with a strong acid and/or oxidizing agent to obtain a graphite intercalation compound (GIC) or graphite oxide (GO), as illustrated in FIG. 1(A) (process flow chart) and FIG. 1(B) (schematic drawing). The presence of chemical species or functional groups (e.g. —COOH) in the interstitial spaces between graphene planes serves to increase the inter-graphene spacing ($d_{002}$, as determined by X-ray diffraction), thereby significantly reducing the van der Waals forces that otherwise hold graphene planes together along the c-axis direction. The GIC or GO is most often produced by immersing natural graphite powder (20 in FIG. 1(A) and 100 in FIG. 1(B)) in a mixture of sulfuric acid, nitric acid (an oxidizing agent), and another oxidizing agent (e.g. potassium permanganate or sodium perchlorate). The resulting GIC (22 or 102) is actually some type of graphite oxide (GO) particles. This GIC or GO is then repeatedly washed and rinsed in water to remove excess acids, resulting in a graphite oxide suspension or dispersion, which contains discrete and visually discernible graphite oxide particles dispersed in water. There are two processing routes to follow after this rinsing step:

Route 1 involves removing water from the suspension to obtain "expandable graphite," which is essentially a mass of dried GIC or dried graphite oxide particles. Upon exposure of expandable graphite to a temperature in the range of typically 800-1,050° C. for approximately 30 seconds to 2 minutes, the GIC undergoes a rapid volume expansion by a factor of 30-300 to form "graphite worms" (24 or 104), which are each a collection of exfoliated, but largely un-separated graphite flakes that remain interconnected. A SEM image of graphite worms is presented in FIG. 2(A).

In Route 1A, these graphite worms (exfoliated graphite or "networks of interconnected/non-separated graphite flakes") can be re-compressed to obtain flexible graphite sheets or foils (26 or 106) that typically have a thickness in the range of 0.1 mm (100 μm)-0.5 mm (500 μm). Alternatively, one may choose to use a low-intensity air mill or shearing machine to simply break up the graphite worms for the purpose of producing the so-called "expanded graphite flakes" (108) which contain mostly graphite flakes or platelets thicker than 100 nm (hence, not a nano material by definition).

Exfoliated graphite worms, expanded graphite flakes, and the recompressed mass of graphite worms (commonly referred to as flexible graphite sheet or flexible graphite foil) are all 3-D graphitic materials that are fundamentally different and patently distinct from either the 1-D nano carbon material (CNT or CNF) or the 2-D nano carbon material (graphene sheets or platelets, NGPs). Flexible graphite (FG) foils can be used as a heat spreader material, but exhibiting a maximum in-plane thermal conductivity of typically less than 500 W/mK (more typically <300 W/mK) and in-plane electrical conductivity no greater than 1,500 S/cm. These low conductivity values are a direct result of the many defects, wrinkled or folded graphite flakes, interruptions or gaps between graphite flakes, and non-parallel flakes (e.g. SEM image in FIG. 2(B)). Many flakes are inclined with respect to one another at a very large angle (e.g. mis-orientation of 20-40 degrees).

In Route 1B, the exfoliated graphite is subjected to high-intensity mechanical shearing (e.g. using an ultrasonicator, high-shear mixer, high-intensity air jet mill, or high-energy ball mill) to form separated single-layer and multi-layer graphene sheets (collectively called NGPs, 33 or 112), as disclosed in our U.S. application Ser. No. 10/858,814. Single-layer graphene can be as thin as 0.34 nm, while multi-layer graphene can have a thickness up to 100 nm, but more typically less than 20 nm.

Route 2 entails ultrasonicating the graphite oxide suspension for the purpose of separating/isolating individual graphene oxide sheets from graphite oxide particles. This is based on the notion that the inter-graphene plane separation has been increased from 0.3354 nm in natural graphite to 0.6-1.1 nm in highly oxidized graphite oxide, significantly weakening the van der Waals forces that hold neighboring planes together. Ultrasonic power can be sufficient to further separate graphene plane sheets to form separated, isolated, or discrete graphene oxide (GO) sheets. These graphene oxide sheets can then be chemically or thermally reduced to obtain "reduced graphene oxides" (RGO) typically having an oxygen content of 0.001%-10% by weight, more typically 0.01%-5% by weight, most typically and preferably less than 2% by weight.

For the purpose of defining the claims of the instant application, NGPs include discrete sheets/platelets of single-layer and multi-layer pristine graphene, graphene oxide, or reduced graphene oxide (RGO). Pristine graphene has essentially 0% oxygen. RGO typically has an oxygen content of 0.001%-5% by weight. Graphene oxide (including RGO) can have 0.001%-50% by weight of oxygen.

It may be noted that flexible graphite foils (obtained by compressing or roll-pressing exfoliated graphite worms) for electronic device thermal management applications (e.g. as a heat sink material) have the following major deficiencies: (1) As indicated earlier, flexible graphite (FG) foils exhibit a relatively low thermal conductivity, typically <500 W/mK and more typically <300 W/mK. By impregnating the exfoliated graphite with a resin, the resulting composite exhibits an even lower thermal conductivity (typically <<200 W/mK, more typically <100 W/mK). (2) Flexible graphite foils, without a resin impregnated therein or coated thereon, are of low strength, low rigidity, and poor structural integrity. The high tendency for flexible graphite foils to get torn apart makes them difficult to handle in the process of making a heat sink. As a matter of fact, the flexible graphite sheets (typically 50-200 μm thick) are so "flexible" that they are not sufficiently rigid to make a fin component material for a finned heat sink. (3) Another very subtle, largely ignored or overlooked, but critically important feature of FG foils is their high tendency to get flaky with graphite flakes easily coming off from FG sheet surfaces and emitting out to other parts of a microelectronic device. These highly electrically conducting flakes (typically 1-200 μm in lateral dimensions and >100 nm in thickness) can cause internal shorting and failure of electronic devices.

Similarly, solid NGPs (including discrete sheets/platelets of pristine graphene, GO, and RGO), when packed into a film, membrane, or paper sheet (34 or 114) of non-woven aggregates using a paper-making process, typically do not exhibit a high thermal conductivity unless these sheets/platelets are closely packed and the film/membrane/paper is ultra-thin (e.g. <1 μm, which is mechanically weak). This is reported in our earlier U.S. patent application Ser. No. 11/784,606 (Apr. 9, 2007). However, ultra-thin film or paper sheets (<10 μm) are difficult to produce in mass quantities, and difficult to handle when one tries to incorporate these thin films as a heat sink material. In general, a paper-like structure or mat made from platelets of graphene, GO, or RGO (e.g. those paper sheets prepared by vacuum-assisted filtration process) exhibit many defects, wrinkled or folded graphene sheets, interruptions or gaps between platelets, and non-parallel platelets (e.g. SEM image in FIG. 3(B)), leading to relatively poor thermal conductivity, low electric conductivity, and low structural strength. These papers or aggregates of discrete NGP, GO or RGO platelets alone (without a resin binder) also have a tendency to get flaky, emitting conductive particles into air.

Another prior art graphitic material is the pyrolytic graphite film, typically thinner than 100 μm. The lower portion of FIG. 1(A) illustrates a typical process for producing prior art pyrolytic graphitic films from a polymer. The process begins with carbonizing a polymer film 46 (e.g. polyimide) at a carbonization temperature of 400-1,000° C. under a typical pressure of 10-15 Kg/cm$^2$ for 2-10 hours to obtain a carbonized material 48, which is followed by a graphitization treatment at 2,500-3,200° C. under an ultrahigh pressure of 100-300 Kg/cm$^2$ for 1-24 hours to form a graphitic film 50. It is technically utmost challenging to maintain such an ultrahigh pressure at such an ultrahigh temperature. This is a difficult, slow, tedious, energy-intensive, and extremely expensive process. Furthermore, it has been difficult to produce pyrolytic graphite film thinner than 15 μm or thicker than 100 μm from a polymer such as polyimide. This thickness-related problem is inherent to this class of materials due to their difficulty in forming into an ultra-thin (<10 μm) and thick film (>100 μm) while still maintaining an acceptable degree of polymer chain orientation and mechanical strength that are required of proper carbonization and graphitization.

A second type of pyrolytic graphite is produced by high temperature decomposition of hydrocarbon gases in vacuum followed by deposition of the carbon atoms to a substrate surface. This vapor phase condensation of cracked hydrocarbons is essentially a chemical vapor deposition (CVD) process. In particular, highly oriented pyrolytic graphite (HOPG) is the material produced by subjecting the CVD-deposited pyro-carbon to a uniaxial pressure at very high temperatures (typically 3,000-3,300° C.). This entails a thermo-mechanical treatment of combined and concurrent mechanical compression and ultra-high temperature for an extended period of time in a protective atmosphere; a very expensive, energy-intensive, time-consuming, and technically challenging process. The process requires ultra-high temperature equipment (with high vacuum, high pressure, or high compression provision) that is not only very expensive to make but also very expensive and difficult to maintain. Even with such extreme processing conditions, the resulting HOPG still possesses many defects, grain boundaries, and mis-orientations (neighboring graphene planes not parallel to each other), resulting in less-than-satisfactory in-plane properties. Typically, the best prepared HOPG sheet or block typically contains many poorly aligned grains or crystals and a vast amount of grain boundaries and defects.

Similarly, the most recently reported graphene thin film (<2 nm) prepared by catalytic CVD of hydrocarbon gas (e.g. $C_2H_4$) on Ni or Cu surface is not a single-grain crystal, but a poly-crystalline structure with many grain boundaries and defects. With Ni or Cu being the catalyst, carbon atoms obtained via decomposition of hydrocarbon gas molecules at 800-1,000° C. are deposited onto Ni or Cu foil surface to form a sheet of single-layer or few-layer graphene that is poly-crystalline. The grains are typically much smaller than 100 μm in size and, more typically, smaller than 10 μm in size. These graphene thin films, being optically transparent and electrically conducting, are intended for applications such as the touch screen (to replace indium-tin oxide or ITO glass) or semiconductor (to replace silicon, Si). Furthermore, the or Cu-catalyzed CVD process does not lend itself to the deposition of more than 5 graphene planes (typically <2 nm) beyond which the underlying Ni or Cu catalyst can no longer provide any catalytic effect. There has been no experimental evidence to indicate that CVD graphene layer thicker than 5 nm is possible. Both CVD graphene film and HOPG are extremely expensive.

Thus, it is an object of the present invention to provide a cost-effective process for producing graphene oxide (GO)-derived highly oriented graphene film, which exhibits a thermal conductivity, electrical conductivity, elastic modulus, and/or tensile strength that are comparable to or greater than those of the HOPG, CVD graphene film, and/or flexible graphite. This process is capable of producing a highly oriented graphene thin film of practically any desired thickness, from several nanometers (nm) to several hundred micrometers (μm).

It is another object of the present invention to provide a process for producing GO-derived highly oriented graphene film thicker than 100 nm or 0.1 μm (preferably thicker than 1 μm) but thinner than 100 μm (preferably thinner than 50 more preferably thinner than 25 μm, and most preferably from 1 to 20 μm) for use as a heat dissipation element in a smart phone, tablet computer, digital camera, display device, flat-panel TV, LED lighting device, etc. Such a thin film exhibits a combination of exceptional thermal conductivity, electrical conductivity, mechanical strength, and elastic modulus unmatched by any material of comparable thickness range. The highly oriented graphene film can exhibit an electrical conductivity greater than 12,000 S/cm, a thermal conductivity greater than 1,500 W/mK, a physical density greater than 2.1 g/cm$^3$, a tensile strength greater than 120 MPa, and/or an elastic modulus greater than 120 GPa. No other material is known to exhibit this set of outstanding properties.

SUMMARY OF THE INVENTION

The present invention provides a process for producing a highly oriented graphitic film with a thickness no greater than 0.1 mm and physical density no less than 1.7 g/cm$^3$ (preferably and typically no less than 1.8 g/cm$^3$, even more typically no less than 1.9 g/cm$^3$). The process consists of: (a) preparing a dispersion of graphene oxide (GO) or chemically functionalized graphene (CFG) having GO or CFG sheets dispersed in a liquid medium, wherein the GO sheets contain an oxygen content higher than 5% by weight or the CFG sheets contain non-carbon element content higher than 5% by weight, and GO or CFG sheets are in an amount sufficient to form a liquid crystal phase in the liquid medium; (b) dispensing and depositing the GO or CFG dispersion onto a surface of a supporting substrate to form a layer of GO or CFG, wherein the dispensing/depositing procedure includes subjecting the liquid crystal phase to an orientation-inducing stress; (c) partially or completely removing the liquid medium from the layer of GO or CFG to form a dried GO or CFG layer having a layer thickness less than 200 μm and having an inter-plane spacing $d_{002}$ of 0.4 nm to 1.2 nm as determined by X-ray diffraction; (d) thermally reducing the dried GO or CFG layer at a first heat treatment temperature higher than 80° C. for a sufficient period of time to produce a porous layer of reduced GO or CFG; (e) further heat-treating the porous layer of reduced GO or CFG at a second heat treatment temperature higher than the first heat treatment temperature for a sufficient period of time to produce a porous graphitic film having an inter-plane spacing $d_{002}$ less than 0.4 nm and the oxygen content or non-carbon element content less than 1% by weight; and (f) compressing the porous graphitic film to produce the highly oriented graphitic film. In a preferred embodiment, the liquid medium consists of water and/or an alcohol. The liquid can contain an organic solvent.

In a preferred embodiment, the process further comprise a step of compressing the porous layer of thermally reduced GO or CFG prior to step (e) to decrease the thickness and increase the density of the layer.

In an embodiment, the dispersion contains a first volume fraction of GO or CFG dispersed in the liquid medium that exceeds a critical volume fraction ($V_c$) required for forming a liquid crystal phase and the dispersion is concentrated to reach a second volume fraction of GO or CFG, greater than the first volume fraction, to improve a GO or CFG sheet orientation. In a preferred embodiment, the first volume fraction is equivalent to a weight fraction of from 0.05% to 3.0% by weight of GO or CFG in the dispersion. The dispersion is then concentrated to contain higher than 3.0% but less than 15% by weight of GO or CFG dispersed in the liquid medium prior to step (b).

In an embodiment, the dispersion further contains a polymer dissolved in the liquid medium or attached to said GO or CFG. The polymer content is preferably lower than 10% by weight dissolved in the liquid (more preferably less than 5% and most preferably less than 2%).

In an embodiment, the CFG contains a chemical functional group selected from a polymer, $SO_3H$, COOH, $NH_2$, OH, R'CHOH, CHO, CN, COCl, halide, COSH, SH, COOR', SR', $SiR'_3$, $Si(-OR'-)_yR'_{3-y}$, $Si(-O-SiR'_2-)OR'$, R", Li, $AlR'_2$, Hg—X, $TlZ_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate, or a combination thereof.

In an embodiment, the GO/CFG dispersion further contains pristine graphene sheets and a weight ratio between the pristine graphene sheets and the GO or CFG sheets is from 1/10 to 10/1. An unexpected synergism was discovered between GO/CFG and pristine graphene when pristine graphene sheets are added to the dispersion to form GO/CFG-pristine graphene liquid crystals.

The present invention also provides a process for producing a highly oriented graphitic film (having a thickness no greater than 0.1 mm and physical density no less than 1.8 g/cm$^3$) from pristine graphene sheets provided they can be formed into a liquid crystalline phase. The process comprises: (a) preparing a dispersion of pristine graphene having pristine graphene sheets dispersed in a liquid medium, wherein the pristine graphene sheets are in an amount sufficient to form a liquid crystal phase in the liquid medium; (b) dispensing and depositing the dispersion onto a surface of a supporting substrate to form a wet layer of pristine graphene, wherein the dispensing and depositing procedure includes subjecting the liquid crystal phase to an orientation-inducing stress; (c) partially or completely removing the liquid medium from the wet pristine graphene layer to form a dried pristine graphene layer having a layer thickness less than 200 μm; (d) optionally compressing the dried pristine graphene layer to reduce a thickness of the pristine graphene layer (e.g. via roll-pressing); (e) heat-treating the pristine graphene layer at a temperature higher than 1,500° C. for a sufficient period of time to produce a graphitic film having an inter-plane spacing $d_{002}$ less than 0.37 nm; and (f) compressing the graphitic film to produce the desired highly oriented graphitic film. Contrary to the commonly believed notion that pristine graphene cannot be formed into a liquid crystalline phase due to an excessively low solubility of pristine graphene in an solvent, we have find a way to form liquid crystals from pristine graphene sheets and discover this process to convert these crystals to a graphitic film.

In an embodiment, the dispersion of pristine graphene further contains up to 20% GO or CFG sheets which are added to the dispersion after the pristine graphene liquid crystal phase is formed. Direct mixing of GO/CFG sheets with pristine graphene sheets somehow slightly impedes the formation of good pristine graphene liquid crystals, leading to a lower degree of graphene orientation in the final graphitic film.

In a preferred embodiment, the second heat treatment temperature is higher than 1,500° C. for a length of time sufficient for decreasing an inter-plane spacing $d_{002}$ to a value less than 0.36 nm and decreasing the oxygen content or non-carbon element content to less than 0.1% by weight. In an embodiment, the second heat treatment temperature includes at least a temperature selected from (A) 300-1,500° C., (B) 1,500-2,100° C., and/or (C) higher than 2,100° C.

In an embodiment, the dried layer of GO or CFG has a thickness no greater than 100 μm, preferably no greater than 50 μm, and more preferably no greater than 20 μm. The highly oriented graphene film preferably has a thickness no less than 0.1 μm (more preferably no less than 1 μm).

The dispersion of GO is prepared by immersing a graphitic material in a powder or fibrous form in an oxidizing liquid in a reaction vessel at a reaction temperature for a length of time sufficient to obtain the GO dispersion wherein the graphitic material is selected from natural graphite, artificial graphite, meso-phase carbon, meso-phase pitch, meso-carbon microbead, soft carbon, hard carbon, coke, carbon fiber, carbon nano-fiber, carbon nano-tube, or a combination thereof and wherein the GO has an oxygen content no less than 5% by weight. The graphene oxide can be further chemically functionalized. Alternatively, the CFG can be prepared by chemically functionalizing pristine graphene sheets.

Preferably, the process is conducted in a roll-to-roll manner. In the above-described process, step (b) can include feeding a sheet of a solid substrate material from a roller to a deposition zone, depositing a layer of graphene oxide dispersion onto a surface of the sheet of solid substrate material to form the wet GO/CFG layer thereon, drying the GO/CFG layer to form the dried GO/CFG layer deposited on the substrate surface, and collecting the dried GO/CFG layer-deposited substrate sheet on a collector roller.

In an embodiment, the first and/or second heat treatment temperature contains a temperature in the range of 300° C.-1,500° C. and the highly oriented graphene film has an oxygen content less than 1%, an inter-graphene spacing less than 0.345 nm, a thermal conductivity of at least 1,000 W/mK, and/or an electrical conductivity no less than 3,000 S/cm. In another embodiment, the first and/or second heat treatment temperature contains a temperature in the range of 1,500° C.-2,100° C. and the highly oriented graphene film has an oxygen content less than 0.01%, an inter-graphene spacing less than 0.337 nm, a thermal conductivity of at least 1,300 W/mK, and/or an electrical conductivity no less than 5,000 S/cm. In yet another embodiment, the first and/or second heat treatment temperature contains a temperature greater than 2,100° C. and the highly oriented graphene film has an oxygen content no greater than 0.001%, an inter-graphene spacing less than 0.336 nm, a mosaic spread value no greater than 0.7, a thermal conductivity of at least 1,500 W/mK, and/or an electrical conductivity no less than 10,000 S/cm. Still another embodiment is that the first and/or second heat treatment temperature contains a temperature no less than 2,500° C. and the highly oriented graphene film has an inter-graphene spacing less than 0.336 nm, a mosaic spread value no greater than 0.4, a thermal conductivity greater than 1,600 W/mK, and/or an electrical conductivity greater than 10,000 S/cm.

In another embodiment, the inventive process can produce a highly oriented graphene film that exhibits an inter-graphene spacing less than 0.337 nm and a mosaic spread value less than 1.0. In an embodiment, the process produces a highly oriented graphene film that exhibits a degree of graphitization no less than 80% and/or a mosaic spread value less than 0.4. In a preferred embodiment, the highly oriented graphene film exhibits a degree of graphitization no less than 90% and/or a mosaic spread value no greater than 0.4. Typically, the highly oriented graphene film contains chemically bonded graphene planes that are parallel to one another.

In an embodiment, the GO or CFG dispersion is obtained from a graphitic material having a maximum original graphite grain size and the highly oriented graphene film is a poly-crystal graphene structure having a grain size larger than this maximum original grain size. In another embodiment, the Go or CFG dispersion is obtained from a graphitic material having multiple graphite crystallites exhibiting no preferred crystalline orientation as determined by an X-ray diffraction method; however, the resultant highly oriented graphene film is a poly-crystal graphene structure having a preferred crystalline orientation as determined by said X-ray diffraction method. In another embodiment, step (e) of heat-treating induces chemical linking, merging, or chemical bonding of graphene oxide sheets, and/or re-graphitization or re-organization of a graphitic structure.

Advantageously, the process produces a highly oriented graphene film that has an electrical conductivity greater than 5,000 S/cm, a thermal conductivity greater than 800 W/mK, a physical density greater than 1.9 g/cm$^3$, a tensile strength greater than 80 MPa, and/or an elastic modulus greater than 60 GPa. In another preferred embodiment, the process produces a highly oriented graphene film that has an electrical conductivity greater than 8,000 S/cm, a thermal conductivity greater than 1,200 W/mK, a physical density greater than 2.0 g/cm$^3$, a tensile strength greater than 100 MPa, and/or an elastic modulus greater than 80 GPa. In a most preferred embodiment, the process produces a highly oriented graphene graphene film that has an electrical conductivity greater than 12,000 S/cm, a thermal conductivity greater than 1,500 W/mK, a physical density greater than 2.1 g/cm$^3$, a tensile strength greater than 120 MPa, and/or an elastic modulus greater than 120 GPa.

The invention also provides a highly oriented graphene film that is produced by the inventive process. Also provided is a microelectronic device containing a highly oriented graphene film as a heat-dissipating element. The microelectronic device can be, as examples, a smart phone, tablet computer, flat-panel display, flexible display, LED lighting device, electronic watch, a wearable electronic device, a digital camera, or a microelectronic communications device.

DESCRIPTION OF THE PREFERRED EMBODIMENTS

Figure 1A:
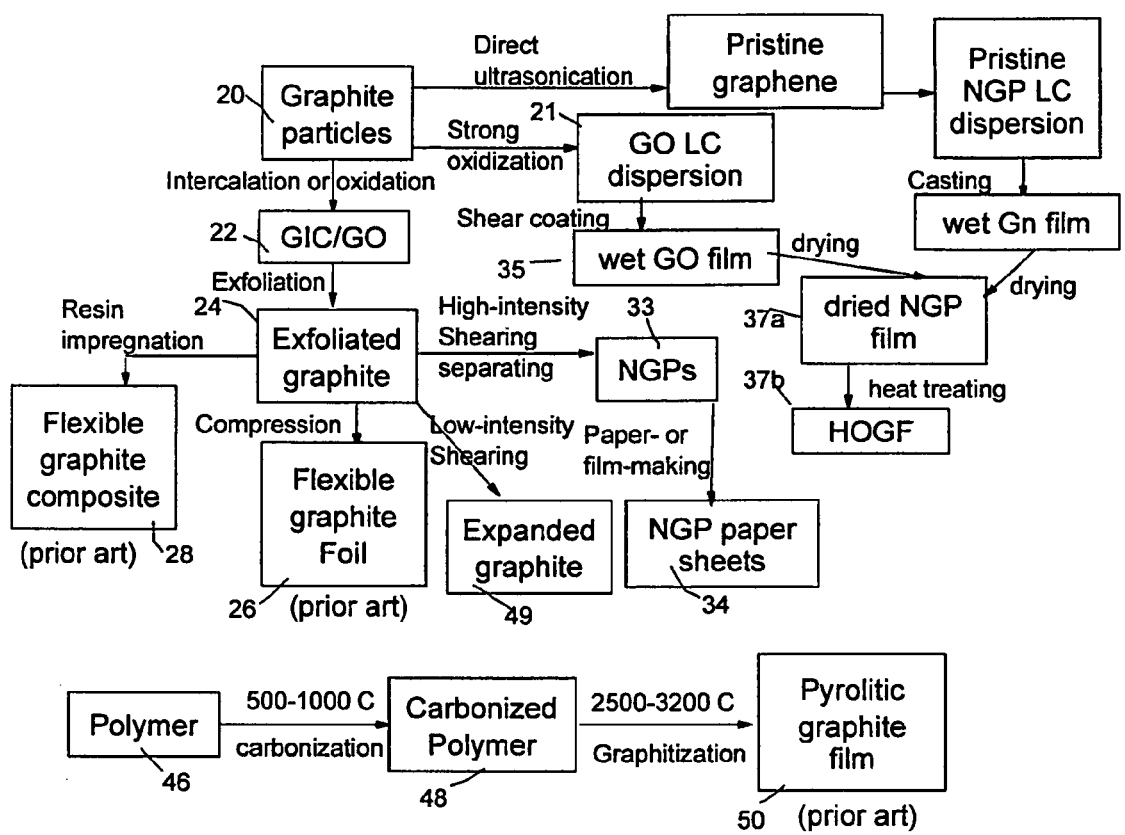
FIG. 1 (A) A flow chart illustrating various prior art processes, of producing exfoliated graphite products (flexible graphite foils and flexible graphite composites) and pyrolytic graphite (bottom portion), along with a process for producing GO LC dispersion 21, wet film 35 containing oriented GO sheets, dried GO film 37a, and HOGF 37b; (B) Schematic drawing illustrating the processes for producing conventional paper, mat, film, and membrane of simply aggregated graphite flakes or NGP platelets.

The present invention provides a process for producing a highly oriented graphene film (HOGF) with a thickness no greater than 0.2 mm (more typically from 100 nm to 100 μm, even more typically from 1 μm to 50 μm, and more typically and desirably from 5 μm to 25 μm). The process includes the following steps:
(a) preparing either a dispersion of graphene oxide (GO) or chemically functionalized graphene (CFG) dispersion having GO/CFG sheets dispersed in a liquid medium, wherein the GO/CFG sheets contain an oxygen content or non-carbon content higher than 5% by weight (typically higher than 10%, can be higher than 20%, or up to approximately 50% by weight; but most typically between 5% and 20%).

a. GO/CFG sheets are preferably single-layer or few-layer graphene sheets (up to 10 layers of graphene planes of mainly carbon atoms) having edge- and surface-borne oxygen-containing functional groups. These O-containing functional groups enable good dispersion or dissolution of GO sheets in a more environmentally benign fluid medium, such as water and/or alcohol (methanol, ethanol, propanol, etc.). Some functional groups enable dispersion of CFGs in certain desired organic solvents.

b. Most importantly, the GO/CFG content (weight fraction or volume fraction of GO/CFG sheets), oxygen content (amount of O-containing functional groups), and GO sheet aspect ratio (width-to-thickness ratio) must be sufficient to enable the formation of a liquid crystal phase in the liquid medium. The detailed conditions under which a liquid crystalline phase can be formed are further discussed in details at a later section.

c. We have surprisingly observed that the presence of GO/CFG liquid crystals help to promote or facilitate preferred orientations of GO/CFG sheets when the dispersing liquid medium is coated or cast onto a solid substrate surface. The resulting GO/CFG films exhibit a higher degree of optical birefringence and the final graphitic films exhibit higher thermal conductivity, electrical conductivity, elastic modulus, and strength as compared to the GO/CFG dispersion that forming a liquid crystal phase.

(b) dispensing and depositing the GO/CFG dispersion onto a surface of a supporting solid substrate to form a wet layer of GO/CFG having a thickness less than 2 mm (preferably less than 1 mm, more preferably less than 0.5 mm, and most preferably less than 0.2 mm or 200 µm), wherein the dispensing and depositing procedure (e.g. coating or casting) include subjecting the dispersion to an orientation-inducing stress;

(c) partially or completely removing the liquid medium from the wet GO/CFG layer to form a dried GO/CFG layer having a dried layer thickness less than 200 µm and an inter-plane spacing $d_{002}$ of 0.4 nm to 1.2 nm as determined by X-ray diffraction and an oxygen content or non-carbon no less than 5% by weight;

(d) thermally reducing the dried GO/CFG layer at a first heat treatment temperature higher than 80° C. for a sufficient period of time to produce a porous layer of thermally reduced GO/CFG;

(e) further heat-treating the porous layer of reduced GO/CFG at a second heat treatment temperature higher than the first heat treatment temperature for a sufficient period of time to produce a porous graphitic film having an inter-plane spacing $d_{002}$ less than 0.4 nm and the oxygen content or non-carbon element content less than 1% by weight; and (f) compressing the porous graphitic film to produce the highly oriented graphitic film.

In an embodiment, step (e) includes heat-treating the graphene oxide mass at a second heat treatment temperature higher than 280° C. for a length of time sufficient for decreasing an inter-plane spacing $d_{002}$ to a value of from 0.3354 nm to 0.36 nm and decreasing the oxygen content or non-carbon content to less than 0.5% by weight (most preferably between 0.001% to 0.01% by weight).

In a preferred embodiment, the second (or final) heat treatment temperature includes at least a temperature selected from (A) 100-300° C., (B) 300-1,500° C., (C) 1,500-2,500° C., and/or (D) higher than 2,500° C. Preferably, the second heat treatment temperature includes a temperature in the range of 300-1,500° C. for at least 1 hour and then a temperature in the range of 1,500-3,200° C. for at least another hour.

The HOGF contains chemically bonded and merged graphene planes. These graphene planes (hexagonal structured carbon atoms having a small amount of oxygen-containing groups or other functional groups) are parallel to one another. The lateral dimensions (length or width) of these planes are huge, typically several times or even orders of magnitude larger than the maximum crystallite dimension (or maximum dimension of constituent graphene planes) of the starting graphite particles. The presently invented HOGF is a "giant graphene crystal" or "giant planar graphene particle" having all constituent graphene planes being essentially parallel to one another. This is a unique and new class of material that has not been previously discovered, developed, or suggested to possibly exist.

The dried oriented GO/CFG layer is itself a very unique and novel class of material that surprisingly has great cohesion power (self-bonding, self-polymerizing, and self-crosslinking capability). These characteristics have not been taught or hinted in the prior art. The GO is obtained by immersing powders or filaments of a starting graphitic material in an oxidizing liquid medium (e.g. a mixture of sulfuric acid, nitric acid, and potassium permanganate) in a reaction vessel. The starting graphitic material may be selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof.

When the starting graphite powders or filaments are mixed in the oxidizing liquid medium, the resulting slurry is a heterogeneous suspension and appears dark and opaque. When the oxidation of graphite proceeds at a reaction temperature for a sufficient length of time, the reacting mass can eventually become a suspension that appears slightly green and yellowish, but remain opaque. If the degree of oxidation is sufficiently high (e.g. having an oxygen content between 20% and 50% by weight, preferably between 30% and 50%) and all the original graphene planes are fully oxidized, exfoliated and separated to the extent that each oxidized graphene plane (now a graphene oxide sheet or molecule) is surrounded by the molecules of the liquid medium, one obtains a GO gel. The GO gel is optically translucent and is essentially a homogeneous solution, as opposed to a heterogeneous suspension. (In the present application, we do not require or desire the GO or CFG dispersion to be in a gel state. Instead, we desire the GO/CFG dispersion to contain a liquid crystalline phase.)

This GO suspension or GO gel as produced typically contains some excess amount of acids and can be advantageously subjected to some acid dilution treatment to increase the pH value (preferably >4.0). It is advantageous to have a sufficient amount of GO/CFG sheets having a proper width-to-thickness ratio (aspect ratio) sufficient for forming a liquid crystalline phase. Preferably, the GO/CFG suspension (dispersion) contains an initial volume fraction of GO/CFG sheets that exceeds a critical or threshold volume fraction required of the formation of a liquid crystal phase. We have observed that such a critical volume fraction is typically equivalent to a GO/CFG weight fraction in the range of from 0.1% to 3.0% by weight of GO/CFG sheets in the dispersion. However, such a range of low GO/CFG contents is not particularly amenable to the formation of the desired thin films using a scalable process, such as casting and coating. The ability to produce thin films via casting or coating is highly advantageous and desirable since large-scaled and/or automated casting or coating systems are readily available, and the processes are known to be reliable for production of polymer thin films with consistently high quality. Therefore, we proceeded to conduct an in-depth and extensive study on the suitability for casting or coating from the dispersion containing a GO/CFG-based liquid crystalline phase. We discovered that by concentrating the dispersion to increase the GO/CFG contents from the range of 0.1% to 3.0% by weight to the range of 3% to 15% by weight of GO/CFG sheets, we obtain a dispersion that is highly suitable to large-scale production of thin graphene films. Most significantly and quite unexpectedly, the liquid crystalline phase is, not only preserved, but often enhanced, making it more feasible for GO/CFG sheets to be oriented along preferred orientations during the casting or coating procedures. In particular, the GO/CFG sheets in a liquid crystal state containing 3% to 15% by weight of GO/CFG sheets have the highest tendency to get readily oriented under the influence of a shear stress created by a commonly used casting or coating process.

Thus, in step (b), the GO/CFG suspension is formed into a wet thin-film layer preferably under the influence of a shear stress that promotes a laminar flow. One example of such a shearing procedure is casting or coating a thin film of GO/CFG suspension using a coating machine. This procedure is similar to a layer of polymer solution being coated onto a solid substrate. The roller, "doctor's blade", or wiper creates a shear stress when the film is shaped, or when there is a relative motion between the roller/blade/wiper and the supporting substrate. Quite unexpectedly and significantly, such a shearing action enables the planar GO/CFG sheets to well align along, for instance, a shearing direction. Further surprisingly, such an alignment state or preferred orientation is not disrupted when the liquid component in the GO/CFG suspension is subsequently removed to form a well-packed layer of highly aligned GO sheets that are at least partially dried. The dried GO layer has a high birefringence coefficient between an in-plane direction and the normal-to-plane direction (thickness direction).

In an embodiment, the present invention includes the discovery of a *facile* amphiphilic self-assembly approach to fabricate GO/CFG-based thin films with desired graphene plane orientations. GO can be considered a negatively charged amphiphilic molecule due to its combination of hydrophilic oxygen-containing functional groups and a hydrophobic basal plane. For a CFG, the functional groups can be made to be hydrophilic or hydrophobic. The successful preparation of the GO/CFG films with unique graphene plane orientations does not require complex procedures. Rather, it is achieved by tailoring GO/CFG synthesis and manipulating the liquid crystalline phase formation and deformation behaviors to enable the self-assembly of GO/CFG sheets in a liquid crystalline phase.

The GO utilized in the presently invented process can be synthesized by the well-known Hummers method, modified Hummers method, Brodie method, or Staudenmaier method. The modified Hummers method is particularly useful. Details are given at several later paragraphs and examples.

The X-ray diffraction (XRD) pattern of the starting graphite powder exhibits a diffraction peak at $2\theta=22.5°$, corresponding to an inter-graphene spacing of 0.3354 nm. The XRD curve of as-prepared GO before exfoliation exhibits a diffraction peak at $8\text{-}11°$, which corresponds to an interlayer spacing from 1.1 nm ($2\theta=8°$) to 0.81 nm ($2\theta=11°$). After mechanical stirring (post-oxidation ultrasonication), this diffraction peak disappears, suggesting that most of the GO sheets have been exfoliated. The increased d spacing from 0.3354 nm to 0.81-1.1 nm is due to the presence of graphene plane-borne functional groups that expand the spacing between graphene planes and, additionally, the formation of hydrogen-bonded networks, which involve functional groups on the GO surface and water molecules within the interlayer spaces.

The GO suspension was further characterized using atomic force microscopy (AFM) to confirm its exfoliation state. The GO sheets are indeed exfoliated with a thickness of about 0.9 nm. This thickness is larger than that of a pristine graphene sheet due to the presence of oxygen-containing functional groups on the GO basal plane. Finally, the presence of lyotropic meso-morphism of GO sheets (liquid crystalline GO phase) in aqueous solution was demonstrated through cross-polarized light observation.

Two major factors dictate if a 1-D or 2-D species can form a liquid crystalline phase in a liquid medium: the aspect ratio (the length/width/diameter-to-thickness ratio) and sufficient dispersibility or solubility of this material in the liquid medium. Single-layer graphene sheets (including pristine graphene, GO, or CFG sheets) feature high anisotropy, with monatomic or few-atom thickness (t) and normally micrometer-scale lateral width (w). According to Onsager's theory, high aspect ratio 2D sheets can form liquid crystals in dispersions, if their volume fraction exceeds a critical value:

$$V_c \approx 4t/w \qquad \text{(Eq. 1)}$$

Given the thickness of pristine graphene being 0.34 nm and a width of 1 μm, the required critical volume would be $V_c \approx 4t/w = 4 \times 0.34/1{,}000 = 1.36 \times 10^{-3} = 0.136\%$. However, pristine graphene sheets are known to be not soluble in water and poorly dispersible in common organic solvents (maximum volume fraction, $V_m$, $\sim 0.7 \times 10^{-5}$ in N-methylpyrrolidone (NMP) and $\sim 1.5 \times 10^{-5}$ in ortho-dichlorobenzene), owing to their strong π-π stacking attraction. Fortunately, the solubility of graphene can be significantly enhanced by chemical modification. In this regard, chemically oxidized graphene or graphene oxide (GO) and chemically functionalized graphene (CFG), possessing a similar anisotropic nature and comparable mechanical strength in bulk to pristine graphene, can be made to exhibit good dispersibility in water and polar organic solvents, such as N,N-dimethyl formamide (DMF) and NMP, due to the numerous oxygen-containing functional groups attached to its edges and two sides.

Although, presumably, the critical volume fraction of GO can be lower than 0.2% or critical weight fraction lower than 0.3% according to theoretical predictions, we have observed that, in general, the critical weight fractions for GO/CFG sheets to form liquid crystals are significantly higher than 0.3% by weight. The most stable liquid crystals are present when the weight fraction of GO/CFG sheets is in the range of 0.5%-3.0%, which enables high stability over a wide temperature range. To study the effect of GO size on the formation of its liquid crystalline structure, GO samples were prepared using a pH-assisted selective sedimentation technique. The lateral sizes of GO and CFG sheets were assessed by dynamic light scattering (DLS) via three different measurement modes, as well as AFM.

During the investigation of GO/CFG liquid crystals we made an unexpected but highly significant discovery: The liquid crystalline phase of GO/CFG sheets in water and other solvents can be easily disrupted or destroyed with mechanical disturbances (e.g. mechanical mixing, shearing, turbulence flow, etc.). The mechanical stability of these liquid crystals can be significantly improved if the concentration of GO/CFG sheets is gradually increased to above 3% (preferably from 3% to 15% by weight) by carefully removing (e.g. vaporizing) the liquid medium without mechanically disturbing the liquid crystalline structure. We further observed that with a GO/CFG weight fraction in this range of 3-15%, GO/CFG sheets are particularly amenable to forming desired orientations during casting or coating to form thin films.

Thermodynamically, the process of amphiphilic GO self-assembly into a liquid crystalline phase is an interplay of the enthalpy change (ΔH) and entropy change (ΔS) as indicated Eq. (2):

$$\Delta G_{self\text{-}assembly} = \Delta H_{self\text{-}assembly} - T\Delta S_{self\text{-}assembly} \quad (2)$$

Previous studies into the thermodynamic driving force for amphiphilic self-assembly into liquid crystal phases indicate that the entropic contribution plays a dominant role, while the enthalpy change is unfavorable in most cases. Onsager's theory predicts that high aspect ratio particles can form liquid crystal phases above a critical volume fraction due to a net gain in entropy as the loss of orientational entropy is compensated for by an increased translational entropy. Specifically, higher aspect ratio particles favor the formation of long-range liquid crystalline phases.

To achieve long-range ordering in an aqueous dispersion, well-exfoliated GO sheets with strong long-range electrostatic repulsion are required. Formation of liquid crystal structures out of colloidal particles typically requires a delicate balance of long-range repulsive forces, such as electrostatic forces, and short-range attractive forces, such as van der Waals forces and π-π interactions. If the long-range repulsive forces are not strong enough to overcome the short-range attractive forces, aggregation of colloidal particles or only weak formation of a lyotropic liquid crystal with small periodicity will inevitably occur. In the GO/CFG aqueous dispersion, long-range repulsive interactions are offered by the electrical double layers formed by the ionized oxygen functional groups. Although GO sheets still contain a considerable portion of hydrophobic domains, attractive π-π interactions and van der Waals forces can be effectively overcome by adjusting the long-range electrostatic repulsive forces The chemical composition of GO/CFG plays an important role in tailoring the electrostatic interaction in an aqueous or organic solvent dispersion. The increase in surface charge density will lead to an increase in the strength of the electrostatic repulsion against the attractive forces. The ratio of the aromatic and oxygenated domains can be easily tuned by the level of graphite oxidation or chemical modification. The Fourier transform infrared spectroscopy under attenuated total reflectance mode (FTIR-ATR) results of the GO indicate that oxidized species (hydroxyl, epoxy, and carboxyl groups) exist on the GO surfaces. Thermogravimetric analysis (TGA) in nitrogen was used to probe the oxygen functional group density on the GO surface. For a highly oxidized GO, a mass loss of ~29% by weight is found at around 250° C. and is attributed to the decomposition of labile oxygen-containing species. Below 160° C., a mass loss of ~17 wt % is observed, corresponding to desorption of physically absorbed water. The X-ray photoelectron spectroscopy (XPS) result of GO shows that an atomic ratio of C/O is about 1.9. This suggests that the GO has a relatively high density of oxygen functional groups. In addition, we also prepared GO containing a lower density of oxygen functional groups by simply reducing the graphite oxidation time. We have observed that liquid crystals can be found with oxygen weight fractions preferentially in the range of 5%-40%, more preferably 5%-30%, and most preferably 5%-20%.

The colloidal interaction between GO sheets can be significantly influenced by the ionic strength, because the Debye screening length (κ-1) can be effectively increased by reducing the concentration of free ions surrounding GO sheets. The electrostatic repulsion of the GO liquid crystal in water could decrease as the salt concentration increases. As a result, more water is expelled from the GO interlamellar space with an accompanying reduction in d spacing. Thus, ionic impurities in the GO dispersions should be sufficiently removed, as it is a crucial factor influencing the formation of a GO liquid crystal structure.

Additionally, we have also found that introduction of some small amount of polymer (up to 10% by weight, but preferably up to 5% by weight, and most preferably up to only 2%) can help stabilize the liquid crystal phase when the GO/CFG dispersion is subjected to casting or coating operations. With proper functional groups and concentrations, the GO/CFG orientation in the resultant film could be enhanced. This also has never been taught or hinted in previous open or patent literature.

The dried GO/CFG layer may then be subjected to heat treatments. A properly programmed heat treatment procedure can involve at least two heat treatment temperatures (first temperature for a period of time and then raised to a second temperature and maintained at this second temperature for another period of time), or any other combination of at least two heat treatment temperatures (HTT) that involve an initial treatment temperature (first temperature) and a final HTT, higher than the first.

The first heat treatment temperature is for thermal reduction of GO/CFG back to a more pure graphene-like structure, and is conducted at the first temperature of >80° C. (can be up to 1,000° C., but preferably up to 700° C., and most preferably up to 300° C.). This is herein referred to as Regime 1:

Regime 1 (up to 300° C.): In this temperature range (the thermal reduction regime), a GO/CFG layer primarily undergoes thermally-induced reduction reactions, leading to a reduction of oxygen content to approximately 5% or lower. This treatment results in a reduction of inter-graphene spacing from approximately 0.8-1.1 nm (as dried) down to approximately 0.4 nm, and an increase in in-plane thermal conductivity from approximately 100 W/mK to 450 W/mK. Even with such a low temperature range, some chemical linking between GO/CFG sheets occurs. The GO/CFG sheets remain well-aligned, but the inter-graphene plane spacing remains relatively large (0.4 nm or larger). Many O-containing functional groups survive.

The highest or final HTT that the thermally reduced layer experiences may be divided into three distinct HTT regimes:

Regime 2 (300° C.-1,500° C.): In this chemical linking regime, additional chemical reduction, extensive chemical combination, polymerization, and merging between adjacent GO/CFG sheets occur. The oxygen content is reduced to typically <0.7% (<<1%) after chemical linking, resulting in a reduction of inter-graphene spacing to approximately 0.345 nm. This implies that some initial graphitization has already begun at such a low temperature, in stark contrast to conventional graphitizable materials (such as carbonized polyimide film) that typically require a temperature as high as 2,500° C. to initiate graphitization. This is another distinct feature of the presently invented HOGF and its production processes. These chemical linking reactions result in an increase in in-plane thermal conductivity to 800-1,200 W/mK, and/or in-plane electrical conductivity to 3,000-4,000 S/cm.

Regime 3 (1,500-2,500° C.): In this ordering and re-graphitization regime, extensive graphitization or graphene plane merging occurs, leading to significantly improved degree of structural ordering. As a result, the oxygen content is reduced to typically 0.01% and the inter-graphene spacing to approximately 0.337 nm (achieving degree of graphitization from 1% to approximately 80%, depending upon the actual HTT and length of time). The improved degree of ordering is also reflected by an increase in in-plane thermal conductivity to >1,200-1,500 W/mK, and/or in-plane electrical conductivity to 5,000-7,000 S/cm.

Regime 4 (higher than 2,500° C.): In this re-crystallization and perfection regime, extensive movement and elimination of grain boundaries and other defects occur, resulting in the formation of nearly perfect single crystals or poly-crystalline graphene crystals with huge grains, which can be orders of magnitude larger than the original grain sizes of the starting graphite particles for the production of GO suspension. The oxygen content is essentially eliminated, typically 0%-0.001%. The inter-graphene spacing is reduced to down to approximately 0.3354 nm (degree of graphitization from 80% to nearly 100%), corresponding to that of a perfect graphite single crystal. Quite interestingly, the graphene poly-crystal has all the graphene planes being closely packed and bonded, and all the planes are aligned along one direction, a perfect orientation. Such a perfectly oriented structure has not been produced even with the HOPG that was produced by subjecting pyrolytic graphite concurrently to an ultra-high temperature (3,400° C.) under an ultra-high pressure (300 Kg/cm$^2$). The HOGF can achieve such a highest degree of perfection with a significantly lower temperature and an ambient pressure (but can be with a slight compression). The thin film structure thus obtained exhibits an in-plane thermal conductivity from 1,500 up to slightly >1,700 W/mK, and in-plane electrical conductivity to a range from 15,000 to 20,000 S/cm.

The presently invented HOGF can be obtained by heat-treating the GO/CFG layer with a temperature program that covers at least the first regime (typically requiring 1-24 hours in this temperature range), more commonly covers the first two regimes (1-10 hours preferred), still more commonly the first three regimes (preferably 0.5-5 hours in Regime 3), and most commonly all the 4 regimes (Regime 4, for 0.5 to 2 hour, may be implemented to achieve the highest conductivity).

X-ray diffraction patterns were obtained with an X-ray diffractometer equipped with CuKcv radiation. The shift and broadening of diffraction peaks were calibrated using a silicon powder standard. The degree of graphitization, g, was calculated from the X-ray pattern using the Mering's Eq, $d_{002}=0.3354 g+0.344 (1-g)$, where $d_{002}$ is the interlayer spacing of graphite or graphene crystal in nm. This equation is valid only when $d_{002}$ is equal or less than approximately 0.3440 nm. The HOGF having a $d_{002}$ higher than 0.3440 nm reflects the presence of oxygen-containing functional groups (such as —OH, >0, and —COOH on graphene plane surfaces) that act as a spacer to increase the inter-graphene spacing.

Another structural index that can be used to characterize the degree of ordering of the presently invented HOGF and conventional graphite crystals is the "mosaic spread," which is expressed by the full width at half maximum of a rocking curve (X-ray diffraction intensity) of the (002) or (004) reflection. This degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Most of our HOGF samples have a mosaic spread value in this range of 0.2-0.4 (if produced with a heat treatment temperature (HTT) no less than 2,500° C.). However, some values are in the range of 0.4-0.7 if the HTT is between 1,500 and 2,500° C., and in the range of 0.7-1.0 if the HTT is between 300 and 1,500° C.

The GO/CFG suspension may be prepared by immersing a graphitic material (in a powder or fibrous form) in an oxidizing liquid to form a reacting slurry in a reaction vessel at a reaction temperature for a length of time sufficient to obtain GO sheets dispersed in a residual liquid. Useful starting graphitic materials include natural graphite, artificial graphite, meso-phase carbon, meso-phase pitch, meso-carbon microbead, soft carbon, hard carbon, coke, carbon fiber, carbon nano-fiber, carbon nano-tube, or a combination thereof.

Typically, this residual liquid after oxidation treatment is a mixture of acid (e.g. sulfuric acid) and oxidizer (e.g. potassium permanganate or hydrogen peroxide). This residual liquid is then washed and replaced with water and/or alcohol to produce a GO dispersion wherein discrete GO sheets (single-layer or multi-layer GO) are dispersed in the fluid. The dispersion is a heterogeneous suspension of discrete GO sheets suspended in a liquid medium and it looks optically opaque and dark (relatively low degree of oxidation) or slightly green and yellowish (if the degree of oxidation is high).

Now, if the GO sheets contain a sufficient amount (e.g. >several % by weight) of oxygen-containing functional groups (e.g. non-carbon content exceeds 40% by weight) and the resulting dispersion (suspension or slurry) is mechanically sheared or ultrasonicated vigorously to produce fully separated, individual GO sheets or molecules that are dissolved (not just dispersed) in water and/or alcohol or other polar solvent, we can reach a material state called "GO gel" in which all individual GO molecules are surrounded by the molecules of the liquid medium. The GO gel looks like a homogeneous solution which is translucent and no discernible discrete GO or graphene sheets can be visibly identified. As the oxidizing reaction proceeds to a critical extent and individual GO sheets are fully separated (now with graphene plane and edges being heavily decorated with oxygen-containing groups), an optically transparent or translucent solution is formed, which is the GO gel.

It may be noted that vigorous shearing or ultrasonication of a GO dispersion (particularly high-concentration dispersion) tends to totally destroy any liquid crystal phase of GO in the liquid medium. In the present study, we chose not to achieve the GO gel state and, instead, chose to keep GO/CFG as discrete sheets that are dispersed (not dissolved) in the liquid medium. In addition, we observed that by beginning with a low GO/CFG concentration without a high-intensity shearing or ultrasonication, one could obtain a dispersion that exceeds a threshold volume fraction for a relatively stable liquid crystalline phase. This critical volume fraction corresponds to a weight fraction of GO/CFG sheets in the range from 0.5% to 3%. The liquid crystalline phase can be preserved or even enhanced if the liquid component is vaporized gradually to effective increase the weight fraction of GO/CFG sheets to the range of 3% to 15% by weight. This GO/CFG fraction range happens to coincide with a liquid dispersion viscosity range suitable for casting or coating into thin films.

Figure 1B:
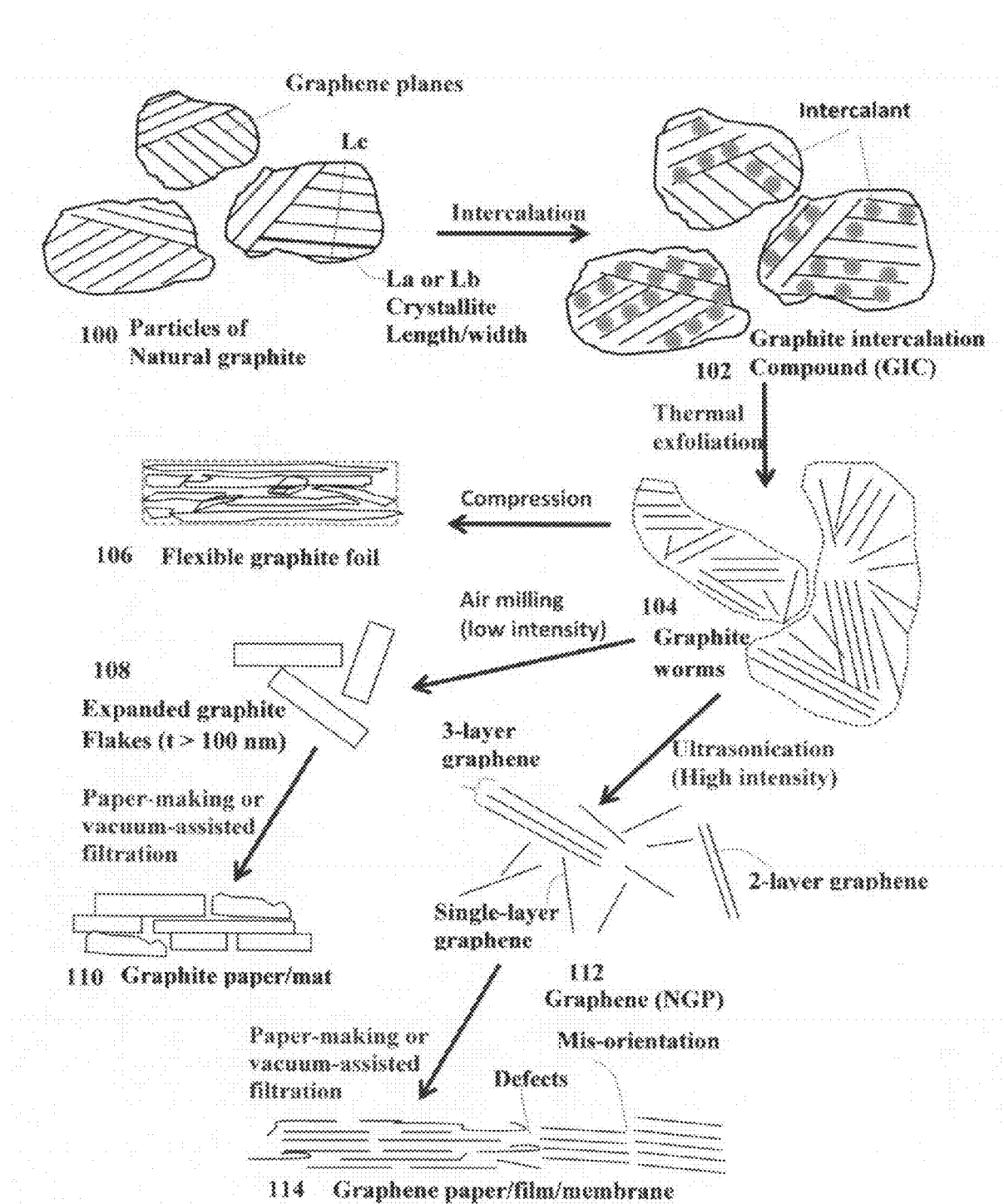

As illustrated in FIG. 1(B), a graphite particle (e.g. 100) is typically composed of multiple graphite crystallites or grains. A graphite crystallite is made up of layer planes of hexagonal networks of carbon atoms. These layer planes of hexagonally arranged carbon atoms are substantially flat and are oriented or ordered so as to be substantially parallel and equidistant to one another in a particular crystallite. These layers of hexagonal-structured carbon atoms, commonly referred to as graphene layers or basal planes, are weakly bonded together in their thickness direction (crystallographic c-axis direction)

by weak van der Waals forces and groups of these graphene layers are arranged in crystallites. The graphite crystallite structure is usually characterized in terms of two axes or directions: the c-axis direction and the a-axis (or b-axis) direction. The c-axis is the direction perpendicular to the basal planes. The a- or b-axes are the directions parallel to the basal planes (perpendicular to the c-axis direction).

A highly ordered graphite particle can consist of crystallites of a considerable size, having a length of $L_a$ along the crystallographic a-axis direction, a width of $L_b$ along the crystallographic b-axis direction, and a thickness $L_c$ along the crystallographic c-axis direction. The constituent graphene planes of a crystallite are highly aligned or oriented with respect to each other and, hence, these anisotropic structures give rise to many properties that are highly directional. For instance, the thermal and electrical conductivity of a crystallite are of great magnitude along the plane directions (a- or b-axis directions), but relatively low in the perpendicular direction (c-axis). As illustrated in the upper-left portion of FIG. 1(B), different crystallites in a graphite particle are typically oriented in different directions and, hence, a particular property of a multi-crystallite graphite particle is the directional average value of all the constituent crystallites.

Due to the weak van der Waals forces holding the parallel graphene layers, natural graphite can be treated so that the spacing between the graphene layers can be appreciably opened up so as to provide a marked expansion in the c-axis direction, and thus form an expanded graphite structure in which the laminar character of the carbon layers is substantially retained. The process for manufacturing flexible graphite is well-known in the art. In general, flakes of natural graphite (e.g. 100 in FIG. 1(B)) are intercalated in an acid solution to produce graphite intercalation compounds (GICs, 102). The GICs are washed, dried, and then exfoliated by exposure to a high temperature for a short period of time. This causes the flakes to expand or exfoliate in the c-axis direction of the graphite up to 80-300 times of their original dimensions. The exfoliated graphite flakes are vermiform in appearance and, hence, are commonly referred to as worms 104. These worms of graphite flakes which have been greatly expanded can be formed without the use of a binder into cohesive or integrated sheets of expanded graphite, e.g. webs, papers, strips, tapes, foils, mats or the like (typically referred to as "flexible graphite" 106) having a typical density of about 0.04-2.0 g/cm³ for most applications.

The upper left portion of FIG. 1(A) shows a flow chart that illustrates the prior art processes used to fabricate flexible graphite foils and the resin-impregnated flexible graphite composite. The processes typically begin with intercalating graphite particles 20 (e.g., natural graphite or synthetic graphite) with an intercalant (typically a strong acid or acid mixture) to obtain a graphite intercalation compound 22 (GIC). After rinsing in water to remove excess acid, the GIC becomes "expandable graphite." The GIC or expandable graphite is then exposed to a high temperature environment (e.g., in a tube furnace preset at a temperature in the range of 800-1,050° C.) for a short duration of time (typically from 15 seconds to 2 minutes). This thermal treatment allows the graphite to expand in its c-axis direction by a factor of 30 to several hundreds to obtain a worm-like vermicular structure 24 (graphite worm), which contains exfoliated, but un-separated graphite flakes with large pores interposed between these interconnected flakes. An example of graphite worms is presented in FIG. 2(A).

In one prior art process, the exfoliated graphite (or mass of graphite worms) is re-compressed by using a calendaring or roll-pressing technique to obtain flexible graphite foils (26 in FIG. 1(A) or 106 in FIG. 1(B)), which are typically 100-300 µm thick. An SEM image of a cross-section of a flexible graphite foil is presented in FIG. 2(B), which shows many graphite flakes with orientations not parallel to the flexible graphite foil surface and there are many defects and imperfections.

Largely due to these mis-orientations of graphite flakes and the presence of defects, commercially available flexible graphite foils normally have an in-plane electrical conductivity of 1,000-3,000 S/cm, through-plane (thickness-direction or Z-direction) electrical conductivity of 15-30 S/cm, in-plane thermal conductivity of 140-300 W/mK, and through-plane thermal conductivity of approximately 10-30 W/mK. These defects and mis-orientations are also responsible for the low mechanical strength (e.g. defects are potential stress concentration sites where cracks are preferentially initiated). These properties are inadequate for many thermal management applications and the present invention is made to address these issues.

In another prior art process, the exfoliated graphite worm 24 may be impregnated with a resin and then compressed and cured to form a flexible graphite composite 28, which is normally of low strength as well. In addition, upon resin impregnation, the electrical and thermal conductivity of the graphite worms could be reduced by two orders of magnitude.

Alternatively, with a low-intensity shearing, graphite worms tend to be separated into the so-called expanded graphite flakes (108 in FIG. 1(B) having a thickness>100 nm. These flakes can be formed into graphite paper or mat 106 using a paper- or mat-making process. This expanded graphite paper or mat 106 is just a simple aggregate or stack of discrete flakes having defects, interruptions, and mis-orientations between these discrete flakes.

Further alternatively, the exfoliated graphite may be subjected to high-intensity mechanical shearing/separation treatments using a high-intensity air jet mill, high-intensity ball mill, or ultrasonic device to produce separated nano graphene platelets 33 (NGPs) with all the graphene platelets thinner than 100 nm, mostly thinner than 10 nm, and, in many cases, being single-layer graphene (also illustrated as 112 in FIG. 1(B)). An NGP is composed of a graphene sheet or a plurality of graphene sheets with each sheet being a two-dimensional, hexagonal structure of carbon atoms.

For the purpose of defining the geometry and orientation of an NGP, the NGP is described as having a length (the largest dimension), a width (the second largest dimension), and a thickness. The thickness is the smallest dimension, which is no greater than 100 nm, preferably smaller than 10 nm in the present application. When the platelet is approximately circular in shape, the length and width are referred to as diameter. In the presently defined NGPs, both the length and width can be smaller than 1 µm, but can be larger than 200 µm.

A mass of multiple NGPs (including discrete sheets/platelets of single-layer and/or few-layer graphene or graphene oxide, 33 in FIG. 1(A)) may be made into a graphene film/paper (34 in FIG. 1(A) or 114 in FIG. 1(B)) using a film- or paper-making process. FIG. 3(B) shows a SEM image of a cross-section of a graphene paper/film prepared from discrete graphene sheets using a paper-making process. The image shows the presence of many discrete graphene sheets being folded or interrupted (not integrated), most of platelet orientations being not parallel to the film/paper surface, the existence of many defects or imperfections. NGP aggregates, even when being closely packed, exhibit a thermal conductivity higher than 1,000 W/mK only when the film or paper is cast and strongly pressed into a sheet having a thickness lower than 10 μm. A heat spreader in many electronic devices is normally required to be thicker than 10 μm but thinner than 35 μm).

Further, even though GO/CFG suspension is obtained from a graphitic material (e.g. powder of natural graphite) having multiple graphite crystallites exhibiting no preferred crystalline orientation, as determined by an X-ray diffraction or electron diffraction method, the resulting HOGF exhibits a very high degree of preferred crystalline orientation as determined by the same X-ray diffraction or electron diffraction method. This is yet another piece of evidence to indicate that the constituent graphene planes of hexagonal carbon atoms that constitute the particles of the original or starting graphitic material have been chemically modified, converted, re-arranged, re-oriented, linked or cross-linked, merged and integrated, re-graphitized, and even re-crystallized.

Pristine graphene or GO may be functionalized through various chemical routes. In one preferred embodiment, the resulting functionalized graphene (Gn) may broadly have the following formula(e):

$$[Gn]\text{-}R_m$$

wherein m is the number of different functional group types (typically between 1 and 5), R is selected from $SO_3H$, COOH, $NH_2$, OH, R'CHOH, CHO, CN, COCl, halide, COSH, SH, COOR', SR', $SiR'_3$, $Si(-OR'-)_yR'_{3-y}$, R", Li, $AlR'_2$, Hg—X, $TlZ_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate.

Assuming that a polymer, such as epoxy resin, can be used to make a coating composition, then the function group $-NH_2$ is of particular interest. For example, a commonly used curing agent for epoxy resin is diethylenetriamine (DETA), which can have 2 or more $-NH_2$ groups. One of the $-NH_2$ groups may be bonded to the edge or surface of a graphene sheet and the remaining un-reacted $-NH_2$ groups will be available for reacting with epoxy resin later. Such an arrangement provides a good interfacial bonding between the graphene sheet and the resin additive.

Other useful chemical functional groups or reactive molecules may be selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof. These functional groups are multi-functional, with the capability of reacting with at least two chemical species from at least two ends. Most importantly, they are capable of bonding to the edge or surface of graphene using one of their ends and, during subsequent curing stage, are able to react with a resin at one or two other ends.

The above-described $[Gn]\text{-}R_m$ may be further functionalized. The resulting CFGs include compositions of the formula:

$$[Gn]\text{-}A_m,$$

where A is selected from OY, NHY, O=C—OY, P=C—NR'Y, O=C—Y, O=C—Y, CR'1-OY N'Y or C'Y, and Y is an appropriate functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—$NR'_2$, R'SH, R'CHO, R'CN, R'X, $R'N^+(R')_3X^-$, $R'SiR'_3$, $R'Si(-OR'-)_yR'_{3-y}$, $R'Si(-O-SiR'_2-)OR'$, R'—R", R'—N—CO, $(C_2H_4O-)_wH$, $(-C_3H_6O-)_wH$, $(-C_2H_4O)_w$—R', $(C_3H_6O)_w$—R', R', and w is an integer greater than one and less than 200.

The graphene sheets may also be functionalized to produce compositions having the formula:

$$[Gn]\text{-}[R'\text{-}A]_m$$

where m, R' and A are defined above. The compositions of the invention also include CFGs upon which certain cyclic compounds are adsorbed. These include compositions of matter of the formula:

$$[Gn]\text{-}[X\text{—}R_a]_m$$

where a is zero or a number less than 10, X is a polynuclear aromatic, polyheteronuclear aromatic or metallopolyheteronuclear aromatic moiety and R is as defined above. Preferred cyclic compounds are planar. More preferred cyclic compounds for adsorption are porphyrins and phthalocyanines. The adsorbed cyclic compounds may be functionalized. Such compositions include compounds of the formula:

$$[Gn]\text{-}[X\text{-}A_a]_m$$

where m, a, X and A are as defined above.

The functionalized graphene of the instant invention can be directly prepared by sulfonation, electrophilic addition to deoxygenated GO surfaces, or metallation. The graphene or GO sheets can be processed prior to being contacted with a functionalizing agent. Such processing may include dispersing the graphene or GO sheets in a solvent. In some instances the sheets may then be filtered and dried prior to contact. One particularly useful type of functional groups is the carboxylic acid moieties, which naturally exist on the surfaces of GOs if they are prepared from acid intercalation route discussed earlier. If an additional amount of carboxylic acid is needed, the GO sheets may be subjected to chlorate, nitric acid, or ammonium persulfate oxidation.

Carboxylic acid functionalized graphene sheets are particularly useful because they can serve as the starting point for preparing other types of functionalized graphene sheets. For example, alcohols or amides can be easily linked to the acid to give stable esters or amides. If the alcohol or amine is part of a di- or poly-functional molecule, then linkage through the O— or NH— leaves the other functionalities as pendant groups. These reactions can be carried out using any of the methods developed for esterifying or aminating carboxylic acids with alcohols or amines as known in the art. Examples of these methods can be found in G. W. Anderson, et al., J. Amer. Chem. Soc. 96, 1839 (1964), which is hereby incorporated by reference in its entirety. Amino groups can be introduced directly onto graphitic fibrils by treating the fibrils with nitric acid and sulfuric acid to obtain nitrated fibrils, then chemically reducing the nitrated form with a reducing agent, such as sodium dithionite, to obtain amino-functionalized fibrils.

We have found that the aforementioned functional groups can be attached to graphene sheet surfaces or edges for one or several of the following purposes: (a) for improved dispersion of graphene or GO in a desired liquid medium; (b) enhanced solubility of graphene or graphene oxide in a liquid medium so that a sufficient amount of graphene or graphene oxide sheets can be dissolved or dispersed in this liquid that exceed the critical volume fraction for liquid crystalline phase formation; (c) enhanced film-forming capability so that thin film of otherwise discrete sheets of graphene or graphene oxide can be coated or cast; (d) improved capability of graphene or GO sheets to get oriented due to modifications to the flow behaviors; and (e) enhanced capability for graphene or GO sheets to get chemically linked and merged into larger or wider graphene planes.

Example 1

Preparation of GO Sheets and GO Liquid Crystals from Natural Graphite Powder Natural graphite from Huadong Graphite Co. (Qingdao, China) was used as the starting material. GO was obtained by following the well-known modified Hummers method, which involved two oxidation stages. In a typical procedure, the first oxidation was achieved in the following conditions: 1100 mg of graphite was placed in a 1000 mL boiling flask. Then, 20 g of $K_2S_2O_8$, 20 g of $P_2O_5$, and 400 mL of a concentrated aqueous solution of $H_2SO_4$ (96%) were added in the flask. The mixture was heated under reflux for 6 hours and then let without disturbing for 20 hours at room temperature. Oxidized graphite was filtered and rinsed with abundant distilled water until neutral pH. A wet cake-like material was recovered at the end of this first oxidation.

For the second oxidation process, the previously collected wet cake was placed in a boiling flask that contains 69 mL of a concentrated aqueous solution of $H_2SO_4$ (96%). The flask was kept in an ice bath as 9 g of $KMnO_4$ was slowly added. Care was taken to avoid overheating. The resulting mixture was stirred at 35° C. for 2 hours (the sample color turning dark green), followed by the addition of 140 mL of water. After 15 min, the reaction was halted by adding 420 mL of water and 15 mL of an aqueous solution of 30 wt % $H_2O_2$. The color of the sample at this stage turned bright yellow. To remove the metallic ions, the mixture was filtered and rinsed with a 1:10 HCl aqueous solution. The collected material was gently centrifuged at 2700 g and rinsed with deionized water. The final product was a wet cake that contained 1.4 wt % of GO, as estimated from dry extracts. Subsequently, liquid dispersions of GO platelets were obtained by lightly sonicating wet-cake materials, which were diluted in deionized water.

Surfactant-stabilized RGO (RGO-BS) was obtained by diluting the wet-cake in an aqueous solution of surfactants instead of pure water. A commercially available mixture of cholate sodium (50 wt %) and deoxycholate sodium (50 wt %) salts provided by Sigma Aldrich was used. The surfactant weight fraction was 0.5 wt %. This fraction was kept constant for all samples. Sonication was performed using a Branson Sonifier S-250A equipped with a 13 mm step disruptor horn and a 3 mm tapered micro-tip, operating at a 20 kHz frequency. For instance, 10 mL of aqueous solutions containing 0.1 wt % of GO was sonicated for 10 min and subsequently centrifugated at 2700 g for 30 min to remove any non-dissolved large particles, aggregates, and impurities. Chemical reduction of as-obtained GO to yield RGO was conducted by following the method, which involved placing 10 mL of a 0.1 wt % GO aqueous solution in a boiling flask of 50 mL. Then, 10 μL of a 35 wt % aqueous solution of $N_2H_4$ (hydrazine) and 70 mL of a 28 wt % of an aqueous solution of $NH_4OH$ (ammonia) were added to the mixture, which was stabilized by surfactants. The solution was heated to 90° C. and refluxed for 1 h. The pH value measured after the reaction was approximately 9. The color of the sample turned dark black during the reduction reaction. These suspensions (GO in water and RGO in surfactant water) were subjected to a single ultracentrifugation at 210,000 g for 10 min to obtain lyotropic liquid-crystal phases. Concentrated sediments were obtained at the bottom of the vials. The weight fraction of the platelets in the concentrated sediment was measured by optical absorbance at a wavelength of 400 nm.

Example 2

Preparation of Discrete GO Sheets from Graphite Fibers

Chopped graphite fibers with an average diameter of 12 μm and natural graphite particles were separately used as a starting material, which was immersed in a mixture of concentrated sulfuric acid, nitric acid, and potassium permanganate (as the chemical intercalate and oxidizer) to prepare graphite intercalation compounds (GICs). The starting material was first dried in a vacuum oven for 24 h at 80° C. Then, a mixture of concentrated sulfuric acid, fuming nitric acid, and potassium permanganate (at a weight ratio of 4:1:0.05) was slowly added, under appropriate cooling and stirring, to a three-neck flask containing fiber segments. After 5-16 hours of reaction, the acid-treated graphite fibers or natural graphite particles were filtered and washed thoroughly with deionized water until the pH level of the solution reached 6. After being dried at 100° C. overnight, the resulting graphite intercalation compound (GIC) or graphite oxide fiber was re-dispersed in water and/or alcohol to form a slurry.

In one sample, five grams of the graphite oxide fibers were mixed with 2,000 ml alcohol solution consisting of alcohol and distilled water with a ratio of 15:85 to obtain a slurry mass. Then, the mixture slurry was subjected to ultrasonic irradiation with a power of 200 W for various lengths of time. After 20 minutes of sonication, GO fibers were effectively exfoliated and separated into thin graphene oxide sheets with oxygen content of approximately 23%-31% by weight. The GO sheets were diluted to a weight fraction of 2% and the suspension was allowed to stay in the container without any mechanical disturbance for 2 days, forming liquid crystalline phase in the water-alcohol liquid when alcohol is being vaporized at 80° C.

The resulting suspension containing GO liquid crystals was then cast onto a glass surface using a doctor's blade to exert shear stresses, inducing GO sheet orientations. The resulting GO coating films, after removal of liquid, have a thickness that can be varied from approximately 10 to 500 μm (for heat-dissipating application in a microelectronic device, this coating film is preferably <200 μm, more preferably <100 μm, and most preferably <50 μm). The resulting GO film was then subjected to heat treatments that involve an initial thermal reduction temperature of 80-350° C. for 8 hours, followed by heat-treating at a second temperature of 1,500-2,850° C. for different specimens. Graphitic films from GO dispersions without going through the liquid crystal formation were also prepared for comparison.

Example 3

Preparation of Single-Layer Graphene Sheets from Meso-Carbon Micro-Beads (MCMBs)

Meso-carbon micro-beads (MCMBs) were supplied from China Steel Chemical Co.; Kaohsiung, Taiwan. This material has a density of about 2.24 g/cm$^3$ with a median particle size of about 16 μm. In one example, MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was no less than 4.5. The slurry was then subjected ultrasonication for 10-100 minutes to fully exfoliate and separate GO sheets. TEM and atomic force microscopic studies indicate that most of the GO sheets were single-layer graphene when the oxidation treatment exceeded 72 hours, and 2- or 3-layer graphene when the oxidation time was from 48 to 72 hours. The GO sheets contain oxygen proportion of approximately 35%-47% by weight for oxidation treatment times of 48-96 hours.

The suspension was then diluted to approximately 0.5% by weight in a container and was allowed to age therein without mechanical disturbance. The suspension was then slightly heated (to 65° C.) to vaporize the water under a vacuum-pumping condition. The formation of liquid crystalline phase became more apparent as water was removed and the GO concentration was increased. The final concentration in this sample was set at 4% by weight. The dispersion containing liquid crystals of GO sheets was than cast onto a glass surface using a doctor's blade to exert shear stresses, inducing GO sheet orientations. The resulting GO films, after removal of liquid, have a thickness that can be varied from approximately 10 to 500 μm. The resulting GO compact was then subjected to heat treatments that typically involve an initial thermal reduction temperature of 80-500° C. for 1-5 hours, followed by heat-treating at a second temperature of 1,500-2,850° C.

Example 4

Preparation of Nematic Liquid Crystals from GO Platelets

Graphite oxide was prepared by oxidation of graphite flakes with an oxidizer liquid consisting of sulfuric acid, sodium nitrate, and potassium permanganate at a ratio of 4:1:0.05 at 30° C. When natural graphite flakes (particle sizes of 14 μm) were immersed and dispersed in the oxidizer mixture liquid for 48 hours, the suspension or slurry appears and remains optically opaque and dark. After 48 hours, the reacting mass was rinsed with water 3 times to adjust the pH value to at least 3.0. A final amount of water was then added to prepare a series of GO-water suspensions.

Graphene oxide aqueous dispersions were prepared by dispersing graphene oxide platelets in deionized water by mild sonication. Any acidic or ionic impurities in the dispersions were removed by dialysis, which is a crucial step for liquid-crystal formation. A limited amount of un-exfoliated graphite oxide particles was carefully discarded by centrifugation.

A low-concentration dispersion (typically 0.05-0.6 wt %) immobilized for a sufficiently long time (usually more than 2 weeks) macroscopically phase-separated into two phases. While the low-density top phase was optically isotropic, the high-density bottom phase demonstrated prominent optical birefringence between two crossed polarizers. A typical nematic schlieren texture consisting of dark and bright brushes was observed in the bottom phase. This is biphasic behavior, where an isotropic phase and nematic phase coexist. The compositional range for the biphase was significantly broad because of the large polydispersity of the GO platelets. It may be noted that ionic strength and pH values significantly influence the stability of GO liquid crystals. The electrostatic repulsion from the dissociated surface functional groups such as carboxylate plays a crucial role in the stability of GO liquid crystals. Thus, reducing repulsive interaction by increasing ionic strength or lowering pH values increased the coagulation of GO platelets.

We observed that substantially all GO sheets form a liquid crystal phase when GO sheets occupy a weight fraction of 1%, and the liquid crystals can be preserved by gradually increasing the concentration of GO to the range of from 5% to 15%. The prepared graphene oxide dispersion exhibited an inhomogeneous, chocolate-milk-like appearance to the naked eye. This milky appearance can be mistaken for aggregation or precipitation of the graphene oxide but, in fact, it is a nematic liquid crystal.

For comparison purposes, we also have prepared GO gel samples by extending the oxidation times to approximately 96 hours. With continued heavy oxidation, the dark-colored, opaque suspension obtained with 48 hours of oxidation turns into a brown-yellowish solution that is translucent upon rinsing with some water.

By dispensing and coating the GO suspension or the GO gel on a polyethylene terephthalate (PET) film in a slurry coater and removing the liquid medium from the coated film we obtained a thin film of dried graphene oxide. Each film was then subjected to different heat treatments, which typically include a thermal reduction treatment at a first temperature of 80° C. to 300° C. for 1-10 hours, and at a second temperature of 1,500° C.-2,850° C. for 0.5-5 hours. With these heat treatments, also under a compressive stress, the GO film was transformed into a HOGF.

The internal structures (crystal structure and orientation) of several dried GO layers, and the HOGF at different stages of heat treatments were investigated. X-ray diffraction curves of a layer of dried GO prior to a heat treatment, a GO film thermally reduced at 150° C. for 5 hours, and the resultant HOGF were obtained. The peak at approximately 2θ=12° of the dried GO layer corresponds to an inter-graphene spacing ($d_{002}$) of approximately 0.7 nm. With some heat treatment at 150° C., the dried film exhibits the formation of a hump centered at 22°, indicating that it has begun the process of decreasing the inter-graphene spacing, indicating the beginning of chemical linking and ordering processes. With a heat treatment temperature of 2,500° C. for one hour, the $d_{002}$ spacing has decreased to approximately 0.336, close to 0.3354 nm of a graphite single crystal.

With a heat treatment temperature of 2,750° C. for one hour, the $d_{002}$ spacing is decreased to approximately to 0.3354 nm, identical to that of a graphite single crystal. In addition, a second diffraction peak with a high intensity appears at 2θ=55° corresponding to X-ray diffraction from (004) plane. The (004) peak intensity relative to the (002) intensity on the same diffraction curve, or the I(004)/I(002) ratio, is a good indication of the degree of crystal perfection and preferred orientation of graphene planes. It is well-known in the art that the (004) peak is either non-existing or relatively weak, with the I(004)/I(002) ratio<0.1, for all conventional graphitic materials heat treated at a temperature lower than 2,800° C. The I(004)/I(002) ratio for the graphitic materials heat treated at 3,000-3,250° C. (e,g, highly oriented pyrolytic graphite, HOPG) is in the range of 0.2-0.5. In contrast, a HOGF prepared from the GO liquid crystal-based film with a final HTT of 2,750° C. for one hour exhibits a I(004)/I(002) ratio of 0.78 and a Mosaic spread value of 0.21, indicating a practically perfect graphene single crystal with an exceptionally high degree of preferred orientation.

The "mosaic spread" value is obtained from the full width at half maximum of the (002) reflection in an X-ray diffraction intensity curve. This index for the degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Most of our HOGF have a mosaic spread value in this range of 0.2-0.4 when produced using a final heat treatment temperature no less than 2,500° C.

It may be noted that the I(004)/I(002) ratio for all tens of flexible graphite foil compacts investigated are all <<0.05, practically non-existing in most cases. The I(004)/I(002) ratio for all graphene paper/membrane samples prepared with a vacuum-assisted filtration method is <0.1 even after a heat treatment at 3,000° C. for 2 hours. These observations have further confirmed the notion that the presently invented HOGS is a new and distinct class of material that is fundamentally different from any pyrolytic graphite (PG), flexible graphite (FG), and paper/film/membrane of conventional graphene/GO/RGO sheets/platelets (NGPs).

Figure 5A:
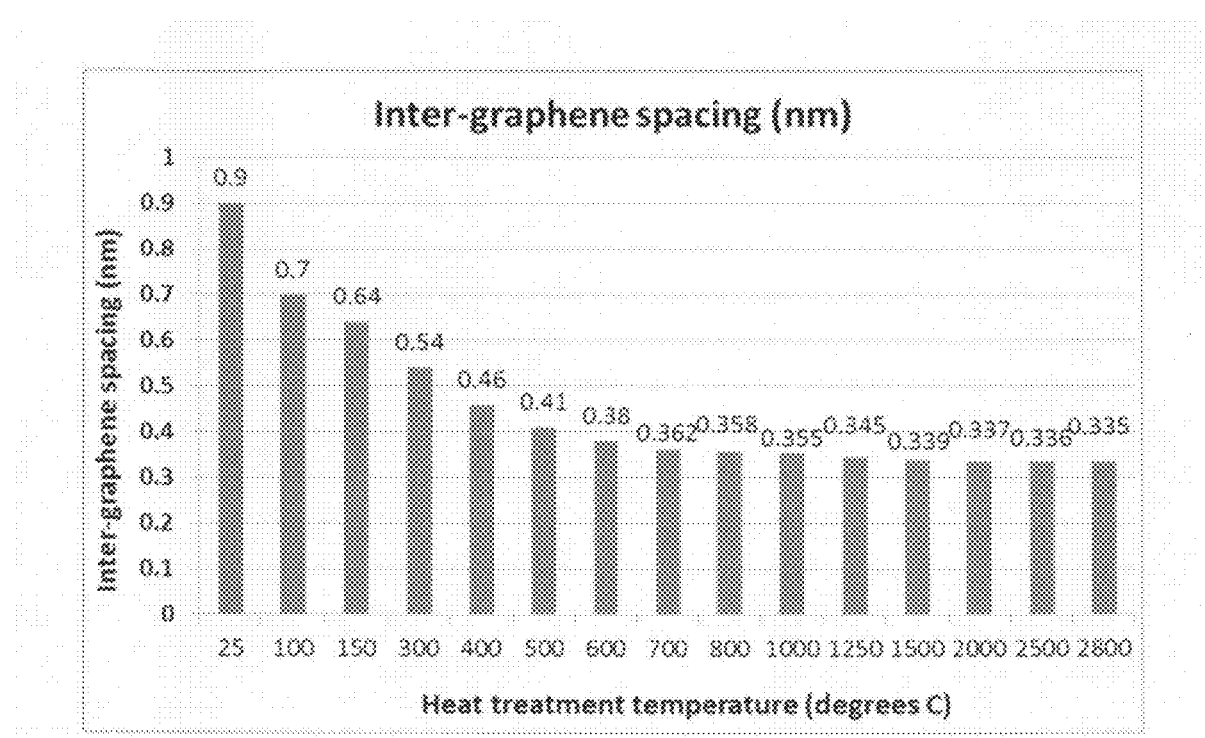
FIG. 5 (A) Inter-graphene plane spacing measured by X-ray diffraction; (B) the oxygen content in the LC GO-derived HOGF; (C) correlation between inter-graphene spacing and the oxygen content; and (D) thermal conductivity of LC GO-derived HOGF, GO gel-derived HOGF, and flexible graphite (FG) foil, all plotted as a function of the final heat treatment temperature.
Figure 5B:
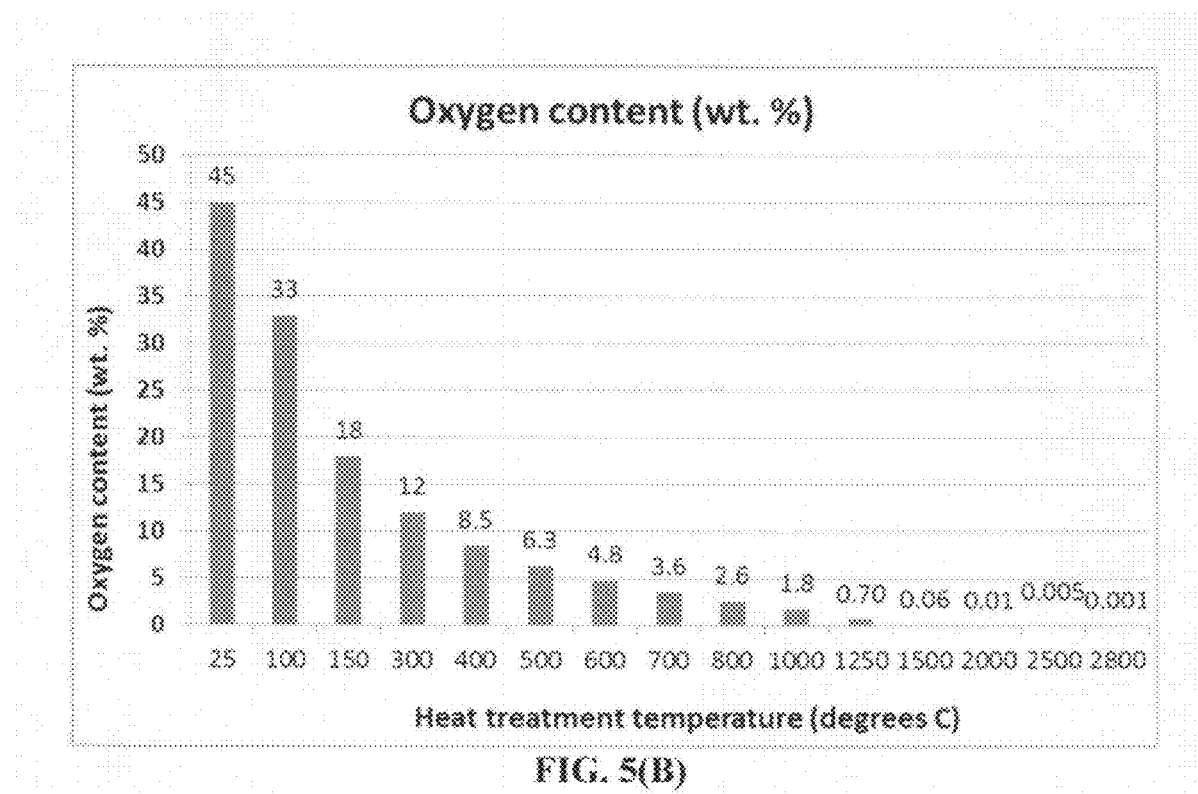
Figure 5C:
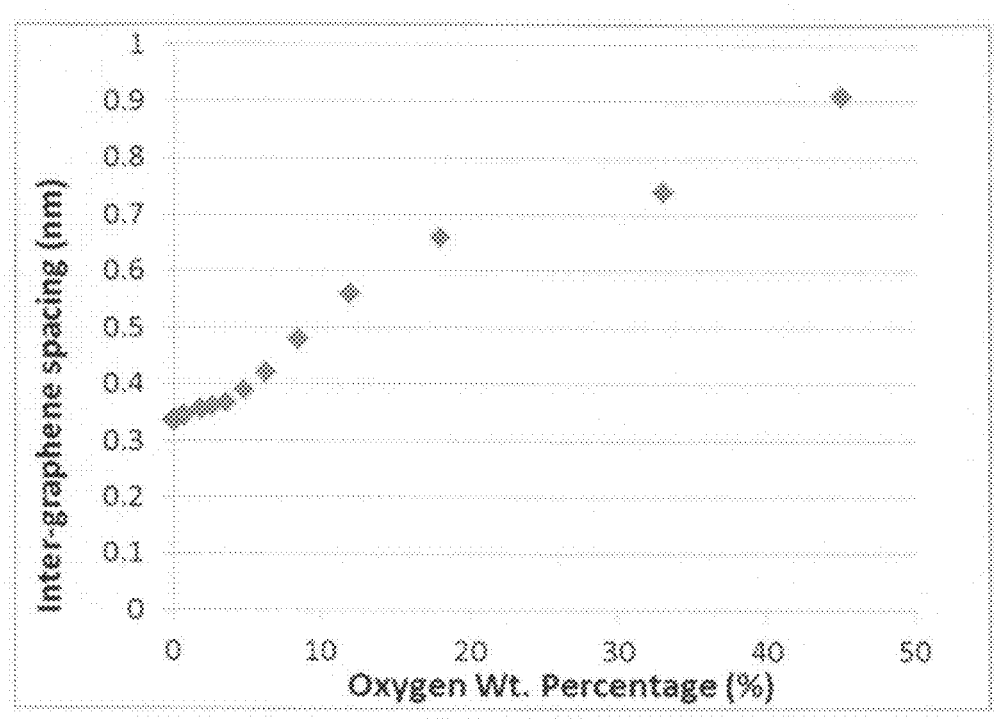
Figure 5D:
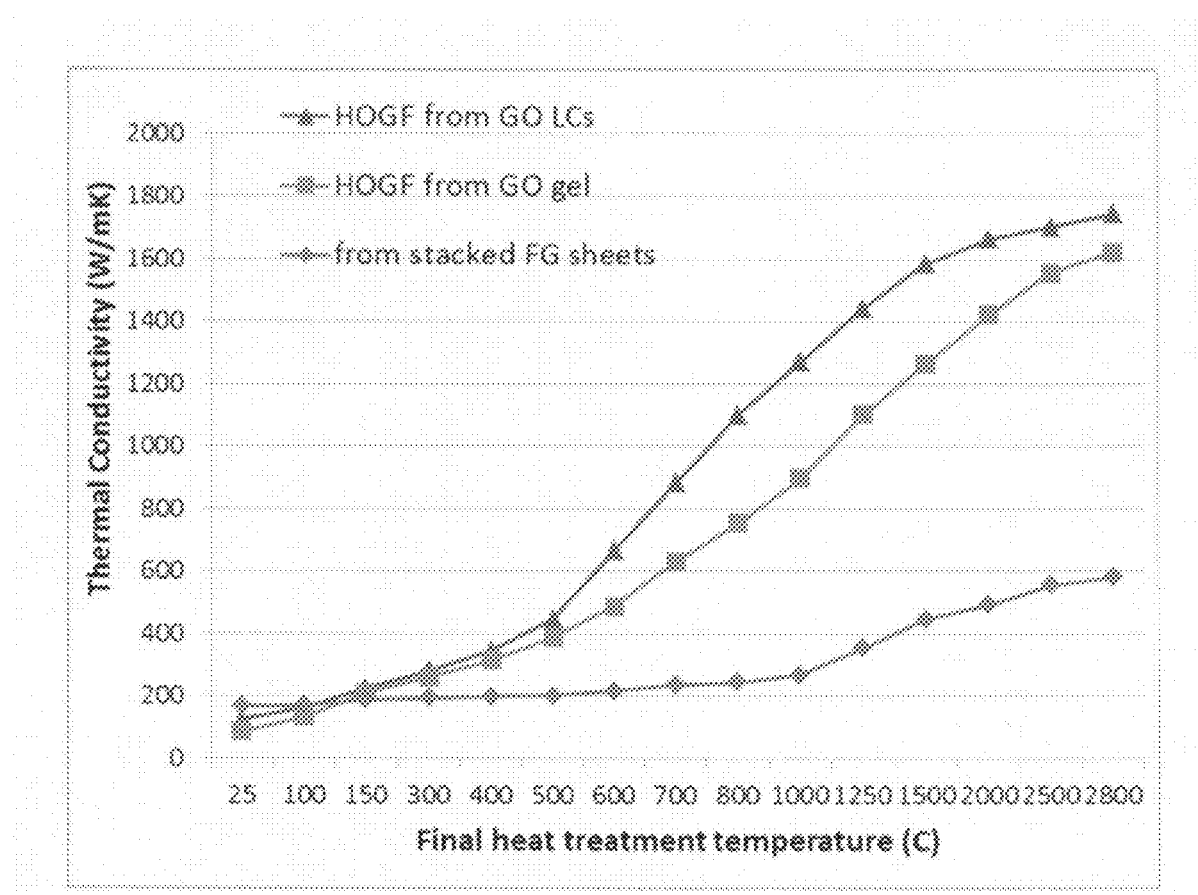

The inter-graphene spacing values of both the GO liquid crystal suspension-derived HOGF samples obtained by heat treating at various temperatures over a wide temperature range are summarized in FIG. 5(A). Corresponding oxygen content values are shown in FIG. 5(B). In order to show the correlation between the inter-graphene spacing and the oxygen content, the data in FIGS. 5(A) and 5(B) are re-plotted in FIG. 5(C). A close scrutiny of FIG. 5(A)-(C) indicate that there are four HTT ranges (100-300° C.; 300-1,500° C.; 1,500-2,000° C., and >2,000° C.) that lead to four respective oxygen content ranges and inter-graphene spacing ranges. The thermal conductivity of the GO gel- and GO liquid crystal-derived HOGF specimens and the corresponding sample of stacked flexible graphite (FG) foil sheets, also plotted as a function of the same final heat treatment temperature range, is summarized in FIG. 5(D). All these samples have comparable thickness values.

It is of significance to point out that a heat treatment temperature as low as 500° C. is sufficient to bring the average inter-graphene spacing in GO to below 0.4 nm, getting closer and closer to that of natural graphite or that of a graphite single crystal. The beauty of this approach is the notion that this GO liquid crystal suspension strategy has enabled us to re-organize, re-orient, and chemically merge the planar GO sheets from originally different graphite particles or graphene sheets into a unified structure with all the graphene planes now being larger in lateral dimensions (significantly larger than the length and width of the graphene planes in the original graphite particles) and essentially parallel to one another. This has given rise to a thermal conductivity already >440 W/mK (with a HTT of 500° C.) and >880 W/mk with a HTT of 700° C.), which is more than 2- to 4-fold greater than the value (200 W/mK) of the corresponding flexible graphite foil. These planar GO sheets are derived from the graphene planes that constitute the original structure of starting natural graphite particles (used in the procedure of graphite oxidation to form the GO sheets). The original natural graphite particles, when randomly packed into an aggregate or "graphite compact", would have their constituent graphene planes randomly oriented, exhibiting relatively low thermal conductivity and having essentially zero strength (no structural integrity). In contrast, the tensile strength of the HOGF samples (even without an added reinforcement) can reach 121 MPa.

Figure 4A:
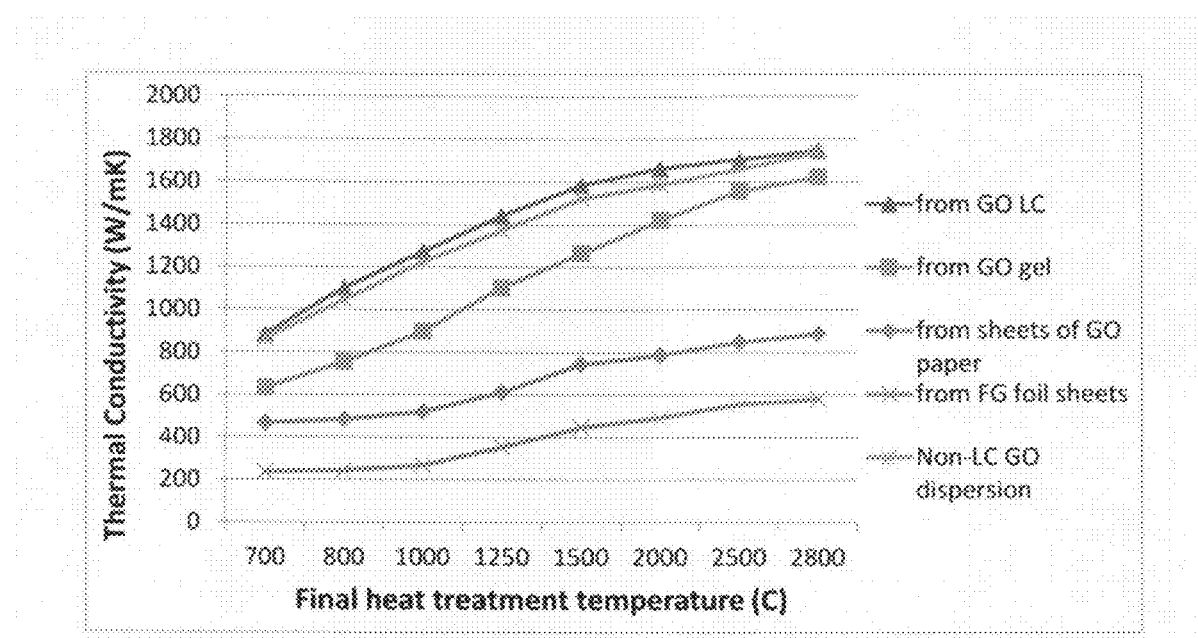
FIG. 4 (A) Thermal conductivity values of the HOGFs derived from liquid crystal GO dispersion, non-LC GO dispersion, GO gel, GO platelet paper, and FG foil plotted as a function of the final heat treatment temperature for graphitization; (B) Thermal conductivity values of the GO LC-derived HOGF, the CVD carbon-derived HOPG, and the poly-imide-derived thermal film, all plotted as a function of the final graphitization temperature; and (C) Electric conductivity values.

With a HTT as low as 800° C., the resulting HOGF exhibits a thermal conductivity of 1,102 W/mK, in contrast to the observed 244 W/mK of the flexible graphite foil with an identical heat treatment temperature. As a matter of fact, no matter how high the HTT is (e.g. even as high as 2,800° C.), the flexible graphite foil only shows a thermal conductivity lower than 600 W/mK. At a HTT of 2,800° C., the presently invented unitary graphene layer delivers a thermal conductivity of 1,745 W/mK (FIG. 4(A) and FIG. 5(D)). It may be further noted that, as indicated in FIG. 4(A), the thermal conductivity values of GO liquid crystal-derived graphitic films are consistently higher than those of corresponding graphitic films derived from either the non-liquid crystal GO suspension or GO gel.

Scanning electron microscopy (SEM), transmission electron microscopy (TEM) pictures of lattice imaging of the graphene layer, as well as selected-area electron diffraction (SAD), bright field (BF), and dark-field (DF) images were also conducted to characterize the structure of unitary graphene materials. For measurement of cross-sectional views of the film, the sample was buried in a polymer matrix, sliced using an ultra-microtome, and etched with Ar plasma.

Figure 2A:
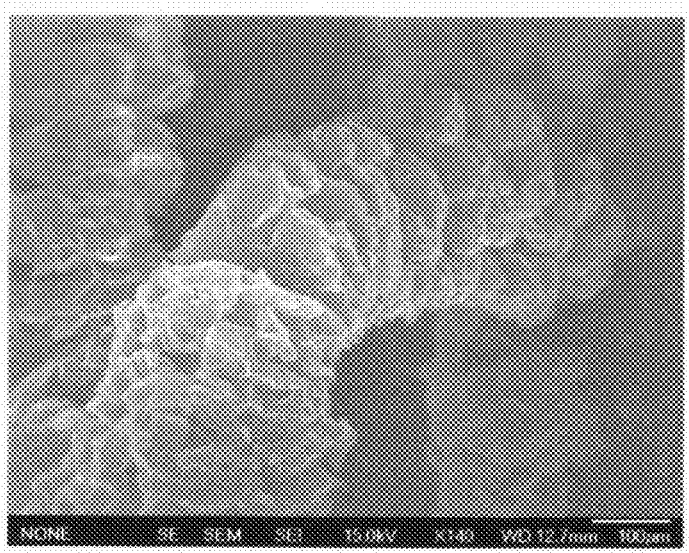
FIG. 2 (A) A SEM image of a graphite worm sample after thermal exfoliation of graphite intercalation compounds (GICs) or graphite oxide powders; (B) An SEM image of a cross-section of a flexible graphite foil, showing many graphite flakes with orientations not parallel to the flexible graphite foil surface and also showing many defects, kinked or folded flakes.
Figure 2B:
Figure 3A:
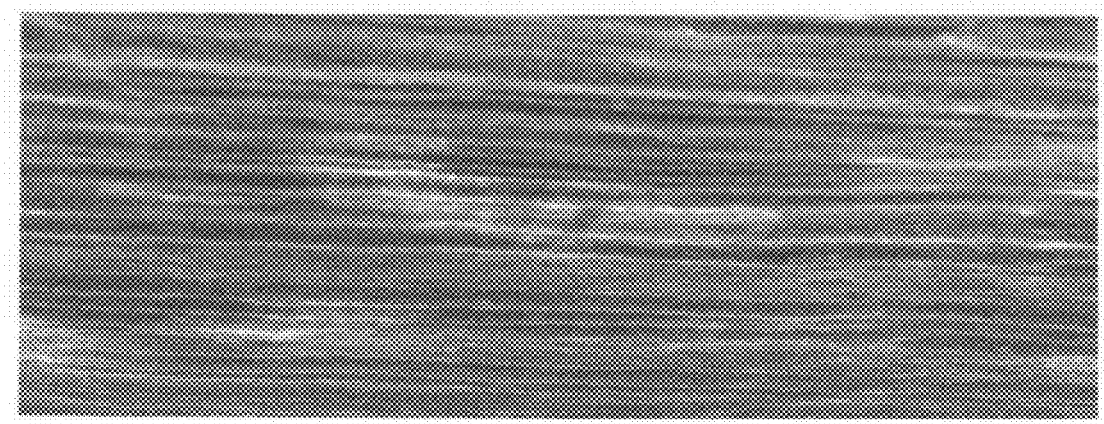
FIG. 3 (A) A SEM image of a GO liquid crystal-derived HOGF, wherein multiple graphene planes (having an initial length/width of 30 nm-300 nm in original graphite particles) have been oxidized, exfoliated, formed into liquid crystals, re-oriented, and seamlessly merged into continuous-length graphene sheets or layers that can run for tens of centimeters wide or long (only a 50 μm width of a 10-cm wide HOGF being shown in this SEM image); (B) A SEM image of a cross-section of a conventional graphene paper prepared from discrete graphene sheets/platelets using a paper-making process (e.g. vacuum-assisted filtration). The image shows many discrete graphene sheets being folded or interrupted (not integrated), with orientations not parallel to the film/paper surface and having many defects or imperfections; (C) schematic of oriented GO sheets being merged together.
Figure 3B:
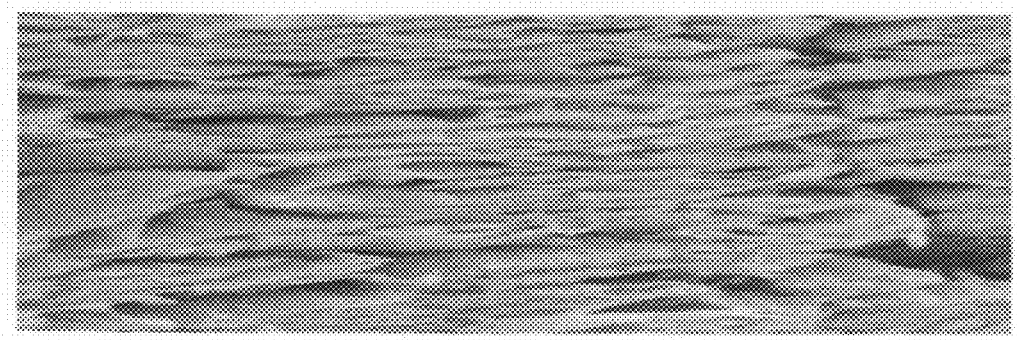
Figure 3C:
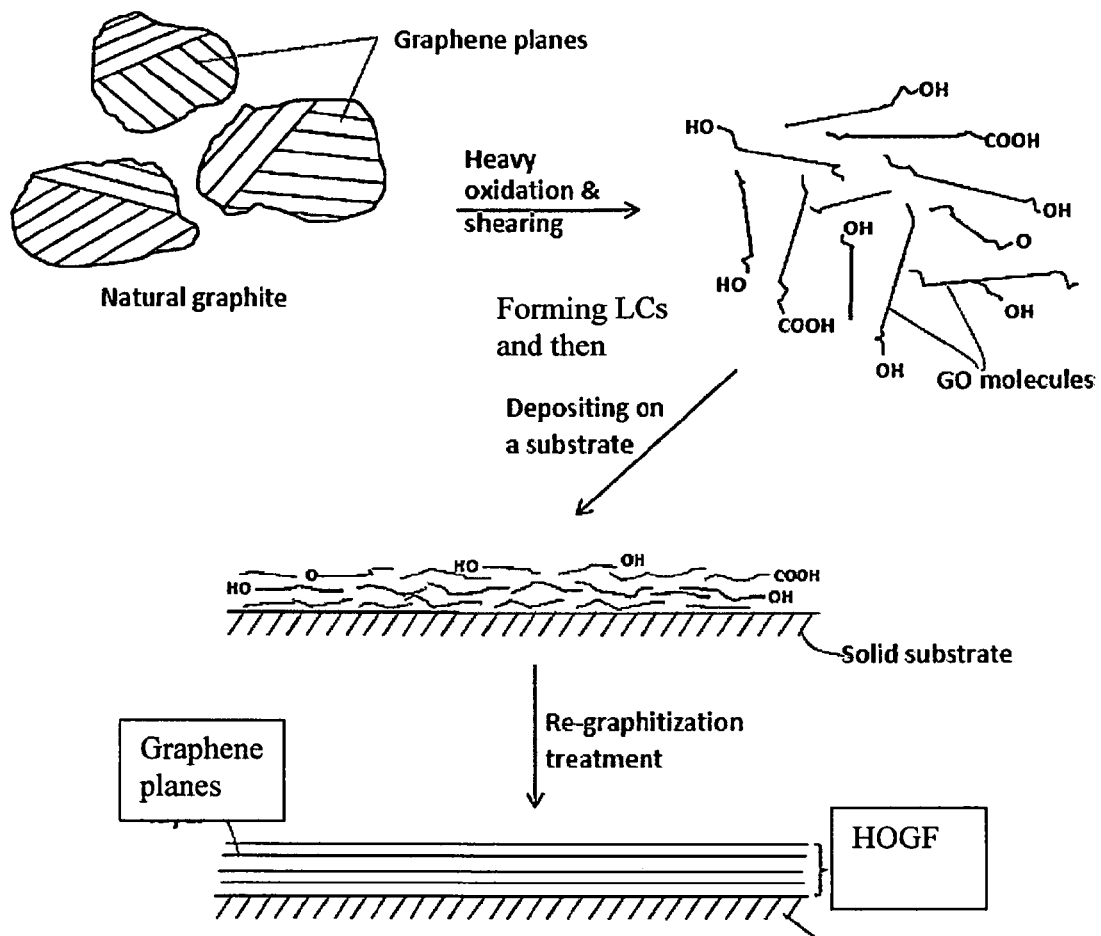

A close scrutiny and comparison of FIGS. 2(A), 3(A), and 3(B) indicates that the graphene layers in a HOGF are substantially oriented parallel to one another; but this is not the case for flexible graphite foils and graphene oxide paper. The inclination angles between two identifiable layers in the unitary graphene entity are mostly less than 5 degrees. In contrast, there are so many folded graphite flakes, kinks, and mis-orientations in flexible graphite that many of the angles between two graphite flakes are greater than 10 degrees, some as high as 45 degrees (FIG. 2(B)). Although not nearly as bad, the mis-orientations between graphene platelets in NGP paper (FIG. 3(B)) are also high and there are many gaps between platelets. The HOGF entity is essentially gap-free.

FIG. 4 (A) shows the thermal conductivity values of the liquid crystal (LC) GO suspension-derived, non-LC GO suspension-derived HOGF, GO gel-derived HOGF, stacked sheets of GO platelet paper prepared by vacuum-assisted filtration of RGO, and FG foil, respectively, all plotted as a function of the final HTT for graphitization or re-graphitization. These data have clearly demonstrated the superiority of the HOGF structures in terms of the achievable thermal conductivity at a given heat treatment temperature.

1) All the prior art work on the preparation of paper or membrane from pristine graphene or graphene oxide sheets/platelets follows distinctly different processing paths, leading to a simple aggregate or stack of discrete graphene/GO/RGO platelets. These simple aggregates or stacks exhibit many folded graphite flakes, kinks, gaps, and mis-orientations, resulting in poor thermal conductivity, low electrical conductivity, and weak mechanical strength.
As shown in FIG. 4(A), even at a heat treatment temperature as high as 2,800° C., the stacked sheets of GO platelet paper exhibits a thermal conductivity less than 1,000 W/mK, much lower than the >1,7450 W/mK of the GO LC-derived HOGF.

2) The GO LC suspension-derived HOGF appears to be superior to the GO gel-derived HOGF in thermal conductivity at comparable final heat treatment temperatures. The heavy oxidation of graphene sheets in GO gel might have resulted in high defect populations on graphene surfaces even after thermal reduction and re-graphitization.

3) For comparison, we have also obtained conventional highly oriented pyrolytic graphite (HOPG) samples from both the CVD carbon film route and the polyimide (PI) carbonization route. The CVD carbon was obtained at 1,100° C. on a Cu substrate. The polyimide films were carbonized at 500° C. for 1 hour and at 1,000° C. for 3 hours in an inert atmosphere. Both the CVD carbon films and carbonized PI films were then graphitized at a temperature in the range of 2,500-3,000° C., under a compressive force, for 1 to 5 hours to form a conventional HPOG structure.

The CVD carbon-derived HOPG was very thin (<less than 1 μm in thickness even after stacking a large number of ultra-thin CVD films together) due to the limitation of the CVD process. Other samples were all approximately 300 μm thick.

Figure 4B:
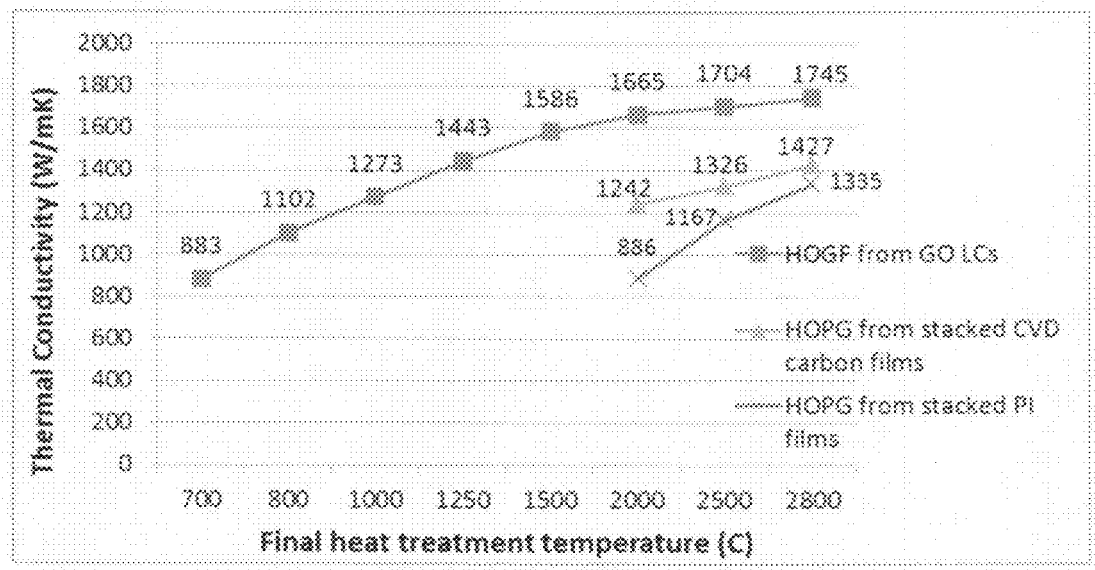

FIG. 4(B) shows the thermal conductivity values of the GO LC suspension-derived HOGF, the CVD carbon-derived HOPG, and the polyimide-derived HOPG heat-treated for three hours under compression, all plotted as a function of the final graphitization temperature. These data show that the conventional HOPG, produced by either CVD or carbonized polyimide (PI) route, exhibits a consistently lower thermal conductivity as compared to the GO LC suspension-derived HOGF, given the same HTT for the same length of heat treatment time. For instance, the HOPG from PI exhibits a thermal conductivity of 886 W/mK after a graphitization treatment at 2,000° C. for 3 hours. At the same final graphitization temperature, the HOGF exhibits a thermal conductivity value of 1,665 W/mK. That the CVD carbon-derived HOPG shows a higher thermal conductivity value compared to the corresponding PI-derived HOPG might be due to the shear low thickness of CVD film that was easier to achieve higher orientation as compared to PI.

4) These observations have demonstrated a clear and significant advantage of using the GO liquid crystal approach to producing HOGF materials versus the conventional PG approach to producing oriented graphite crystals. As a matter of fact, no matter how long the graphitization time is for the HOPG, the thermal conductivity is always lower than that of a GO liquid crystal-derived HOGF. In other words, the HOGF is fundamentally different and patently distinct from the flexible graphite (FG) foil, graphene/GO/RGO paper/membrane, and pyrolytic graphite (PG) in terms of chemical composition, crystal and defect structure, crystal orientation, morphology, process of production, and properties.

Figure 4C:
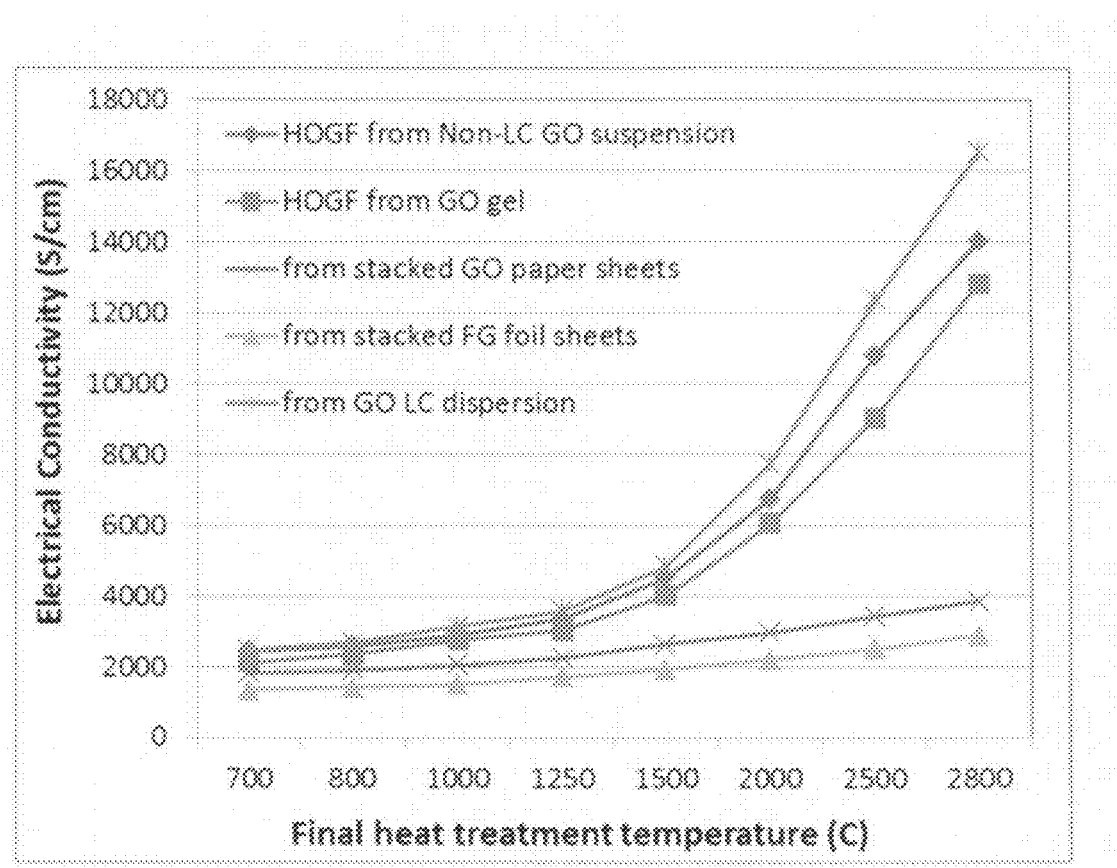

5) The above conclusion is further supported by the data in FIG. 4(C) showing the electric conductivity values of the liquid crystal (LC) suspension-derived, non-LC GO suspension-derived HOGF and GO gel-derived HOGF are far superior to those of the GO paper from RGO platelets and FG foil sheets over the entire range of final HTTs investigated.

Example 4

Preparation of Pristine Graphene Sheets/Platelets (0% Oxygen) and the Effect of Pristine Graphene Sheets Recognizing the possibility of the high defect population in GO sheets acting to reduce the conductivity of individual graphene plane, we decided to study if the use of pristine graphene sheets (non-oxidized and oxygen-free) can lead to a HOGF having a higher thermal conductivity. Pristine graphene sheets were produced by using the direct ultrasonication or liquid-phase production process.

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free.

Various amounts of pristine graphene sheets were added to GO suspensions to obtain mixture suspensions wherein GO and pristine graphene sheets are dispersed in a liquid medium. The same procedure was then followed to produce HOGF samples of various pristine graphene proportions. The thermal conductivity data of these samples are summarized in FIG. 6, which indicate that the thermal conductivity of the HOGF produced from pure pristine graphene sheets (presumably themselves being highly conducting) without forming a liquid crystalline phase is surprisingly lower than that of the HOGF from GO sheets (of low conductivity due to high defect population on graphene planes). SEM examination of the samples indicate that the pristine graphene sheet-derived HOGF (without going through the liquid crystal step) has poor graphene sheet orientation and has many graphene sheet kinks and foldings.

Further surprisingly, there are synergistic effects that can be observed when both the pristine graphene sheets and GO sheets co-exist in proper proportions. It seems that GO can help pristine graphene sheets get dispersed well in a suspension and get them better oriented when being coated or cast into thin films. Yet, the high conductivity of pristine graphene sheets, when properly oriented, helps the resulting HOGF achieve a higher over-all conductivity.

Figure 6:
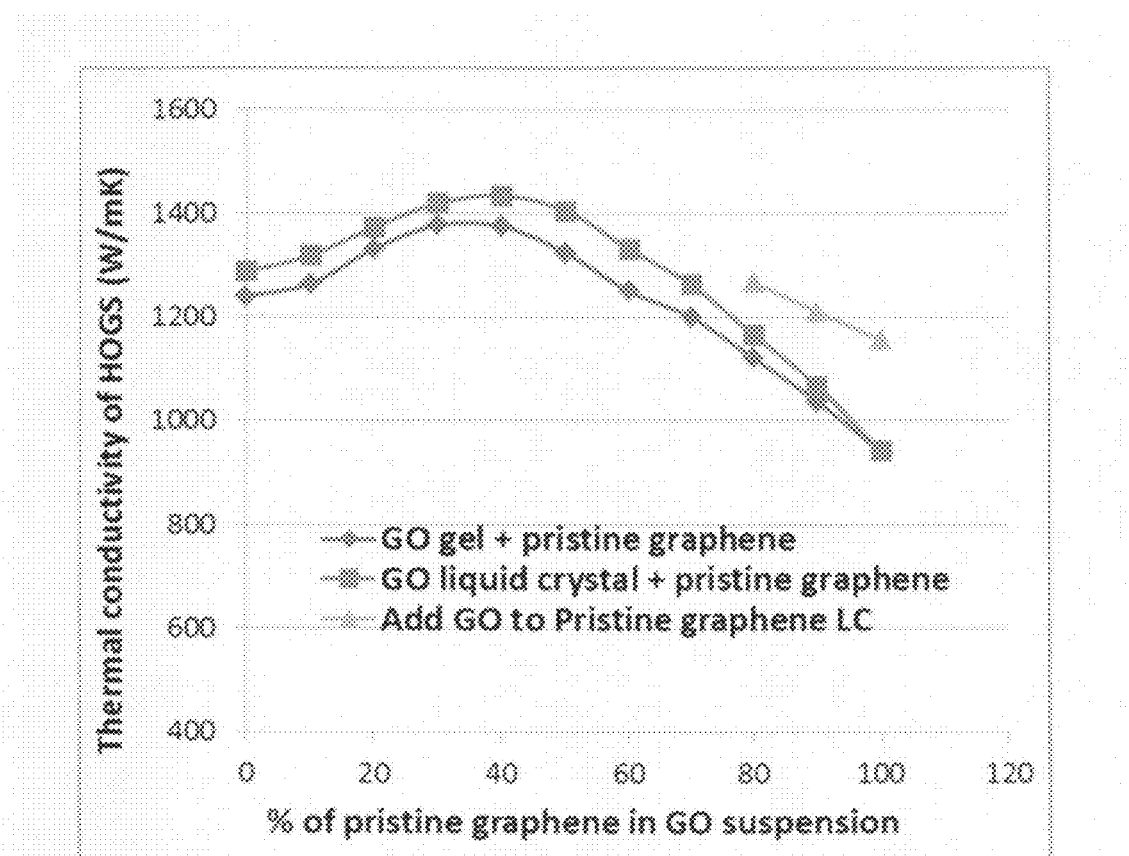
FIG. 6 Thermal conductivity of HOGF samples plotted as a function of the proportion of pristine graphene sheets added in a GO suspension. Thermal conductivity values of 3 HOGF samples prepared from pristine graphene liquid crystal-based dispersion are also shown.

Shown in FIG. 6 are three data points corresponding to the samples prepared by a specially designed process that involves producing a suspension that contains a high concentration of pristine graphene sheets (orders of magnitude higher than the concentrations ever reported in literature). Approximately 0.1% by weight of pristine graphene sheets was re-dispersed back to deionized water containing a high concentration of the same dispersion agent as used in direct ultrasonication. The suspension was subjected to a controlled vaporization at 80° C. for 12 hours without disturbance, allowing the pristine graphene sheets in this dispersion to form liquid crystals. The suspension was cast to form a thin layer of wet graphene film. After (not before) the liquid crystalline phase was formed, some amounts (10% and 20%) of GO sheets were added into the dispersion containing pristine graphene single crystals. These data points show this approach led to significantly higher thermal conductivity values than those prepared by mixing pristine graphene sheets into a GO dispersion first.

Examples 5

Tensile Strength of Various Graphene Oxide-Derived HOGFs

Figure 7A:
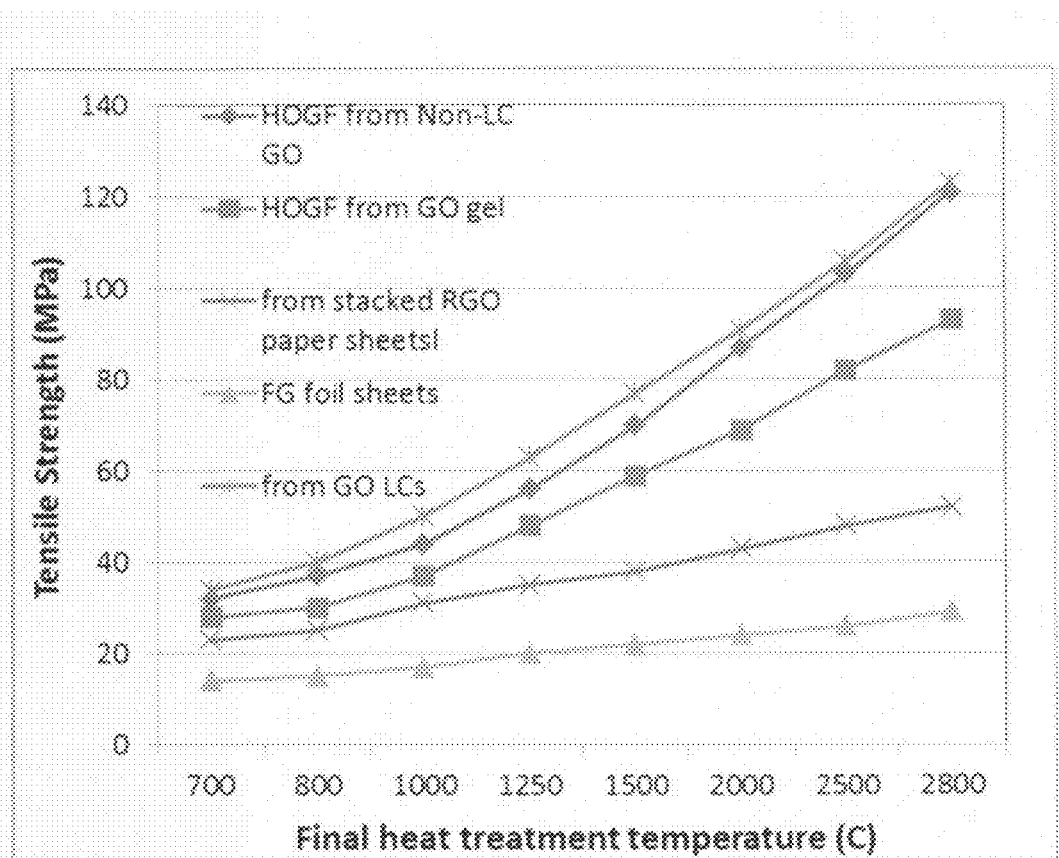
FIG. 7 (A) Tensile strength and (B) tensile modulus of the HOGFs produced from LC GO dispersion, non-LC GO dispersion, GO gel, GO platelet paper, and flexible graphite foil sheets over a range of heat treatment temperatures.
Figure 7B:
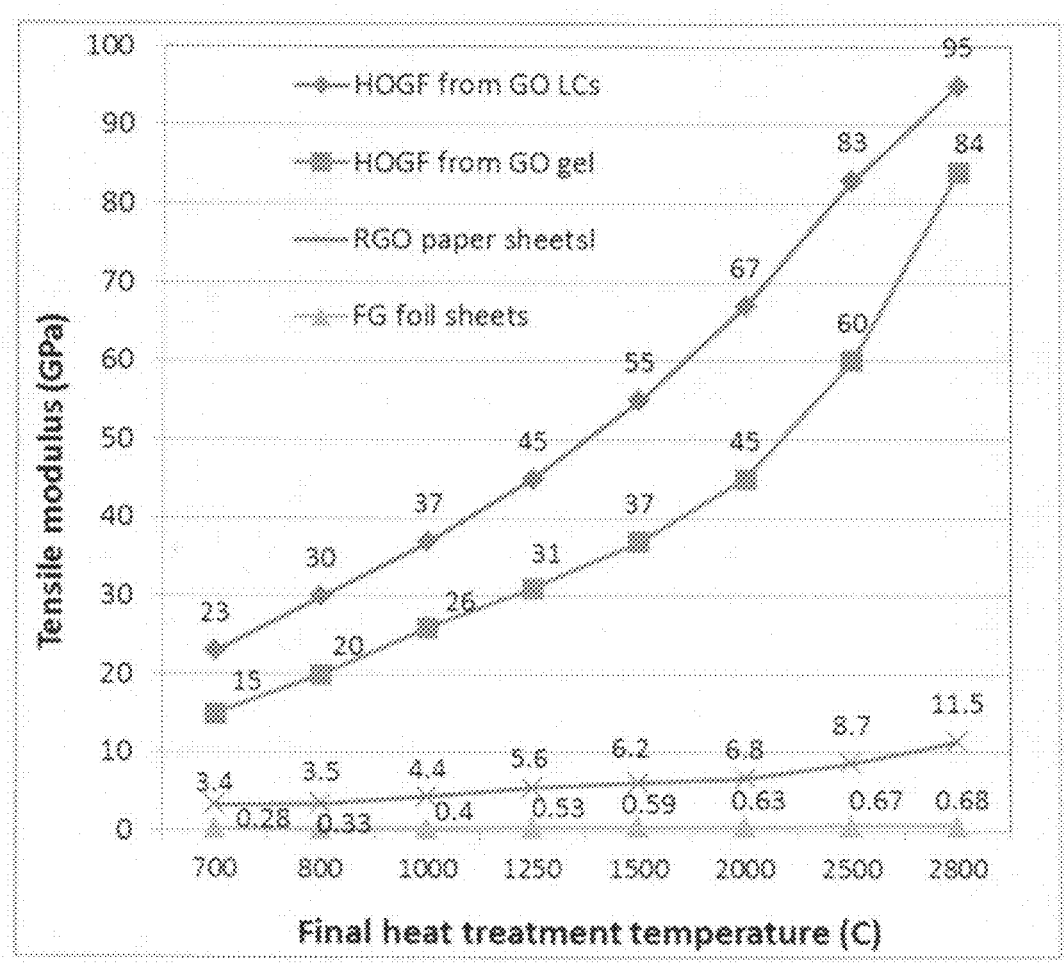

A series of LC GO dispersion-derived HOGF, non-LC GO dispersion-derived, GO gel-derived HOGF, stacked/compressed sheets of GO platelet paper, and FG foil were prepared by using a comparable final heat treatment temperature for all materials. A universal testing machine was used to determine the tensile properties of these materials. The tensile strength and modulus of these various samples prepared over a range of heat treatment temperatures are shown in FIGS. 7(A) and 7(B), respectively.

These data have demonstrated that the tensile strength of the graphite foil-derived sheets increases slightly with the final heat treatment temperature (from 14 to 29 MPa) and that of the GO paper (compressed/heated sheets of GO paper) increases from 23 to 52 MPa when the final heat treatment temperature increases from 700 to 2,800° C. In contrast, the tensile strength of the LC GO-derived HOGF increases significantly from 30 to >93 MPa over the same range of heat treatment temperatures. Most dramatically, the tensile strength of the GO suspension-derived HOGF increases significantly from 34 to 124 MPa. This result is quite striking and further reflects the notion that the GO LC dispersion contain highly active GO sheets during the heat treatment that are capable of chemical linking and merging, while the graphene platelets in the conventional GO paper and the graphite flakes in the FG foil are essentially dead platelets. The GO LC-derived HOGF is a new class of material by itself.

Example 6

Synthesis of Polyacrylonitrile-Grafted GO (GO-g-PAN)

Acrylonitrile (AN) was dried over calcium chloride for 48 h, distilled under reduced pressure, and stored at −20° C. 2,2'Azobis(2-methylpropionitrile) (AIBN) and potassium persulfate ($K_2S_2O_8$) were employed after twice recrystallization.

To study an example of chemically functionalized graphene, PAN was grafted onto GO via the in situ free radical polymerization procedure. Typically, 100 mg of GO and 80 mL of dimethylformamide (DMF) were added to a 150 mL round-bottom flask, and a well-dispersed solution was obtained by sonicating in a 40 kHz sonic bath for 10 min. Followed by addition of 10.6 g of AN (200 mmol) and 82 mg of initiator of AIBN (0.5 mmol), the solution was purged with nitrogen for 40 min and then immersed in an oil bath at 65° C. After reacting for 48 h under $N_2$ protection and stirring, the reaction was terminated by exposure to air. The resultant mixture was precipitated in methanol, and the resulting gray precipitate was collected and re-dissolved in 200 mL of DMF. The solution was then centrifuged at the speed of 15 000 rpm (23,300 G) for 0.5-1 h to remove free polymers that were not covalently attached to GO. The resultant cream-like fluid was thoroughly washed with DMF for eight times until the upper layer appeared colorless. Then the resulting black colloidal product of GO-g-PAN was dispersed in 50 mL of DMF ready for use.

The polymer-modified GO sheets were found to undergo transition from an isotropic phase to a liquid crystalline phase at a higher threshold volume fraction ($V_c$), which seems to be a little disadvantage, but since coating or casting was conducted with a dispersion of significantly higher concentration (e.g. >3% by weight far exceeding $V_c$), this high $V_c$ is not a concern. However, this polymer component has made it easier to form thin films with good mechanical integrity and improved ease of handling, which are highly desirable features. A GO-g-PAN dispersion was cast to produce a wet film, which was dried and thermally treated, at 300° C. for 5 hours, 1,000° C. for 3 hours, and then 2,500° C. for 2 hours. The density of GO-g-PAN liquid crystal-derived film is 2.15 g/cm$^3$, exhibiting a thermal conductivity of 1,570 W/mk.

For comparison, the paper of GO-g-PAN was prepared by vacuum-assisted filtration of DMF dispersion with concentration of 5 mg/mL, followed by drying at 50° C. in vacuum for 12 h. The paper sheet was compressed and then subjected to the same thermal treatments. The density of GO-g-PAN paper-derived film is 1.72 g/cm$^3$, exhibiting a thermal conductivity of 820 W/mk.

Examples 7

Polymer-Modified GO Liquid Crystals

We have further observed that organic polymers, such as polyvinyl alcohol (PVA), polyacrylamide (PAA), poly(ethylene oxide) (PEO), chitosan, and poly(styrene-4-sulfonate) (PSS), can be used to modify GO liquid crystals for improving film-forming characteristics of GO liquid crystal phase. GO was prepared according to the previously described procedure (example 1). As one example, we prepared a series of PVA-modified reduced GO (RGO) with the PVA fraction (PVA/(PVA+RGO) ranging from 1% to 20%. In a typical procedure for preparing PVA-RGO with PVA Mw of 89-98 kDa, 20 g PVA was added to a 1000 mL round-bottom flask containing 500 mL de-ionized water followed by heating at 80° C. until PVA was completely dissolved. After adding 125 mL GO aqueous dispersion (8 mg/mL) to the solution of PVA, it was stirred for 5 h. Then 1 mL hydrazine solution (85%) was added to the dispersion and stirred for 1 h at 95° C. The neat PVA-RGO was obtained by repeated centrifugation (23,294 g) and hot water washing to completely remove the unattached free polymer. The PVA-RGO sheets were re-dispersed in water to a weight fraction of approximately 1.5%, allowed to settle without mechanical disturbance for 12 hours; liquid crystalline phase began to appear after 2-3 hours. The suspension was coated on PET surface to form a wet PVA-RGO film on a roll-to-roll basis. The film-forming capability of RGO was significantly improved with the presence of some PVA. High-quality films were obtained with this composition after being subjected to desired heat treatments (300° C. for 5 hours, 1,000° C. for 3 hours, and then 2,500° C. for 2 hours). For comparison, sheets of PVA-RGO paper were prepared by vacuum-assisted filtration.

For instance, a 10 mL PVA-RGO dispersion (1 mg/mL) was sonicated (40 kHz) for 0.5 h and then filtered through a cellulose film (0.22 mm pore size). The as-prepared PVA-RGO paper supported on the cellulose film was placed in a vacuum oven at 80° C. for 12 h, and finally the cellulose film was dissolved in acetone to recover the freestanding PVA-RGO paper.

Example 8

GO Liquid Crystals in Organic Solvents

In order to obtain fully oxidized graphite and preserve the high initial lateral sizes of graphite flakes, dry expandable graphite flakes (3772, Asbury Graphite Mills, USA) were first thermally treated at 1050° C. for 15 s. The resultant expanded graphite (EG) was used as the precursor for GO synthesis using the following method. Briefly, 5 g of EG and 1 L of sulfuric acid were mixed and stirred in a flask for 24 h. Then 50 g of $KMnO_4$ was added to the mixture dropwise. The mixture was transferred into an ice bath, and 1 L of Milli-Q water and 250 mL of $H_2O_2$ were poured slowly into the mixture, realizing a color change of the suspension to light brown. After being stirred for another 30 min, the GO particles were then washed and centrifuged with a HCl solution (9:1 water/HCl by volume), then centrifuged again and washed with Milli-Q water until the pH of the solution became about 5-6. The resultant ultra-large GO sheets were dispersed in deionized water by gentle shaking (i.e., without the aid of sonication process and without creating a turbulent flow).

N,N-Dimethylformamide (DMF), N-cyclohexyl-2-pyrrolidone (CHP), tetrahydrofuran (THF), acetone, ethylene glycol, N-methyl pyrrolidone (NMP), dimethyl acetamide (DMAc), methanol, isopropyl alcohol, and absolute ethanol, all from Sigma, have been chosen for investigation. LC GO dispersions in various organic solvents were prepared by extraction of water from the parent aqueous LC GO dispersion via repeated centrifugation-washing steps (6 times of 10-30 min at 11000 rpm) using the selected solvent. Briefly, 15 mL of the parent aqueous LC GO (2.5 mg/mL) was poured into a 50 mL centrifuge tube to which 20 mL of the selected solvent was added and then mixed vigorously by vortex shaking. After centrifugation, 30 mL of the supernatant was extracted, replaced with 30 mL of the selected solvent, and then mixed vigorously by vortex shaking. This process was repeated 5 times to replace water with the selected organic solvent. This was then followed by diluting the suspension with the same solvent to a GO weight fraction of 0.5%, letting the suspension to get settled for 24 hours. The solvent was then gradually vaporized by placing the GO sheets in a vacuum oven at a temperature lower than the boiling point of the solvent. GO liquid crystals were found to naturally form during the solvent vaporization procedure. This procedure was continued until a GO concentration greater than 3% by weight was reached. We have observed that these organic solvent-based liquid crystal-containing dispersions can also be readily cast or coated into thin films, which can be subsequently heat-treated to produce HOGFs. These HOGFs exhibit comparable electrical, thermal, and mechanical properties as those prepared from water-based liquid mediums.

The highly oriented graphene film (HOGF) derived from the GO/CFG liquid crystals has the following characteristics:

(1) The HOGF is an integrated graphene oxide or practically oxygen-free graphene structure that is typically a poly-crystal having large grains. The HOGF has wide/long chemically bonded graphene planes that are all essentially oriented parallel to one another. In other words, the crystallographic c-axis directions of all the constituent graphene planes in all grains are essentially pointing in the same direction.

(2) The HOGF is a fully integrated, essentially void-free, graphene monolith no longer containing any discernable, discrete flakes or platelets of original GO/CFG sheets. The HOGF is relatively defect-free. In contrast, the paper-like sheets of exfoliated graphite worms (i.e., flexible graphite foils), mats of expanded graphite flakes (>100 nm in thickness), and paper or membrane of graphene or GO platelets (<100 nm) are a simple, un-bonded aggregate/stack of multiple discrete graphite flakes or discrete platelets of graphene, GO, or RGO. The flakes or platelets in these paper/membrane/mats are poorly oriented and have lots of kinks, bends, and wrinkles. Many voids or other defects are present in these paper/membrane/mats.

(3) In prior art processes, discrete graphene sheets (<<100 nm, typically <10 nm) or expanded graphite flakes (>100 nm) that constitute the original structure of graphite particles could be obtained via expanding, exfoliating, and separating treatments. By simply mixing and re-compressing these discrete sheets/flakes into a bulk object, one could attempt to orient these sheets/flakes hopefully along one direction through compression. However, with these conventional processes, the poorly oriented and highly separated flakes or sheets maintain their identity even after ultra-high temperature treatments.

In contrast, the highly aligned and closely stacked GO/CFG sheets in the thin film derived from liquid crystals, when heated to a high temperature, can react and chemically join with one another mostly in lateral directions along graphene planes (in an edge-to-edge manner) and, in some cases, between graphene planes as well. These linking and merging reactions proceed in such a manner that the sheets are chemically merged, linked, and integrated into one single entity. All the constituent graphene planes are very large in lateral dimensions (length and width) and these graphene planes are essentially bonded together with one another and aligned parallel to one another. In-depth studies using a combination of SEM, TEM, selected area diffraction, X-ray diffraction, AFM, Raman spectroscopy, and FTIR indicate that the HOGF is composed of several huge graphene planes (with length/width typically >>100 μm and can be >>1 mm).

(4) This HOGF is not made by gluing or bonding discrete flakes/platelets together with a resin binder, linker, or adhesive. Instead, GO/CFG sheets are merged through joining or forming of covalent bonds with one another, into an integrated graphene entity, without using any externally added linker or binder molecules or polymers.

(5) This HOGF is typically a poly-crystal composed of large grains having incomplete grain boundaries, typically with the crystallographic c-axis in all grains being essentially parallel to each other. This entity is derived from a GO/CFG liquid crystalline suspension, which is in turn obtained from natural graphite or artificial graphite particles originally having multiple graphite crystallites. Prior to being chemically oxidized, these starting graphite crystallites have an initial length ($L_a$ in the crystallographic a-axis direction), initial width ($L_b$ in the b-axis direction), and thickness ($L_c$ in the c-axis direction). Upon oxidation, these initially discrete graphite particles are chemically transformed into highly aromatic graphene oxide molecules having a significant concentration of edge- or surface-borne functional groups (e.g. —OH, —COOH, etc.). These aromatic GO molecules in the GO suspension have lost their original identity of being part of a graphite particle or flake. Upon formation of liquid crystalline phase, formation of thin films, and removal of the liquid component from the films, the resulting GO sheets form an essentially amorphous structure. Upon heat treatments; these GO sheets are chemically merged and linked into a unitary or monolithic graphene entity that is highly ordered.

The resulting unitary graphene entity typically has a length or width significantly greater than the $L_a$ and $L_b$ of the original crystallites. The length/width of this HOGF is significantly greater than the $L_a$ and $L_b$ of the original crystallites. Even the individual grains in a poly-crystalline HOGF have a length or width significantly greater than the $L_a$ and $L_b$ of the original crystallites. They can be as large as the length or width of the HOGF itself, not just 2 or 3 times higher than the initial $L_a$ and $L_b$ of the original crystallites.

(6) Due to these unique chemical composition (including oxygen content), morphology, crystal structure (including inter-graphene spacing), and structural features (e.g. high degree of orientations, few defects, incomplete grain boundaries, chemical bonding and no gap between graphene sheets, and no interruptions in graphene planes), the GO/CFG liquid crystal-derived HOGF has a unique combination of outstanding thermal conductivity, electrical conductivity, mechanical strength, and stiffness (elastic modulus).

In conclusion, we have successfully developed an absolutely new, novel, unexpected, and patently distinct class of highly conducting and high-strength material and processes of production: highly oriented graphene film (HOGF). The chemical composition (oxygen content), structure (crystal perfection, grain size, defect population, etc), crystal orientation, morphology, process of production, and properties of this new class of materials are fundamentally different and patently distinct from flexible graphite foil, polymer-derived pyrolytic graphite, CVD-derived HOPG, and catalytic CVD graphene thin film. The thermal conductivity, electrical conductivity, elastic modulus, and tensile strength exhibited by the presently invented materials are much higher than what prior art flexible graphite sheets, paper of discrete graphene/

GO/RGO platelets, or other graphitic materials could possibly achieve. These HOGF materials have the best combination of excellent electrical conductivity, thermal conductivity, mechanical strength, and stiffness (modulus). These HOGF materials can be used in a wide variety of thermal management applications. For instance, a HOGF structure can be part of a thermal management device, such as a heat dissipation film used in a smart phone, tablet computer, flat-panel TV display, or other microelectronic or communications device.

We claim:

1. A process for producing a highly oriented graphitic film with a thickness no greater than 0.1 mm and physical density no less than 1.8 g/cm$^3$, said process comprising:
   a) preparing a dispersion of graphene oxide (GO) or chemically functionalized graphene (CFG) having GO or CFG sheets dispersed in a liquid medium, wherein said GO sheets contain an oxygen content higher than 5% by weight or said CFG sheets contain non-carbon element content higher than 5% by weight, and GO or CFG sheets are in a liquid crystal phase in said liquid medium;
   b) dispensing and depositing said GO or CFG dispersion onto a surface of a supporting substrate to form a layer of GO or CFG, wherein said dispensing and depositing procedure includes subjecting said liquid crystal phase to an orientation-inducing stress;
   c) partially or completely removing said liquid medium from the layer of GO or CFG to form a dried GO or CFG layer having a layer thickness less than 200 μm and having an inter-plane spacing d002 of 0.4 nm to 1.2 nm as determined by X-ray diffraction;
   d) thermally reducing said dried GO or CFG layer at a first heat treatment temperature higher than 80° C. for a sufficient period of time to produce a porous layer of reduced GO or CFG;
   e) further heat-treating said porous layer of reduced GO or CFG at a second heat treatment temperature higher than the first heat treatment temperature for a sufficient period of time to produce a porous graphitic film having an inter-plane spacing d002 less than 0.4 nm and the oxygen content or non-carbon element content less than 1% by weight; and
   f) compressing said porous graphitic film to produce said highly oriented graphitic film.

2. The process of claim 1, further comprising a step of compressing said porous layer of reduced GO or CFG prior to said step (e).

3. The process of claim 1, wherein said dispersion contains a first volume fraction of GO or CFG dispersed in said liquid medium that exceeds a critical volume fraction (Vc) for a liquid crystal phase formation and said dispersion is concentrated to reach a second volume fraction of GO or CFG, greater than the first volume fraction, to improve a GO or CFG sheet orientation.

4. The process of claim 3, wherein said first volume fraction is equivalent to a weight fraction of from 0.05% to 3.0% by weight of GO or CFG in said dispersion.

5. The process of claim 4, wherein said dispersion is concentrated to contain higher than 3.0% but less than 15% by weight of GO or CFG dispersed in said liquid medium prior to said step (b).

6. The process of claim 1, wherein said dispersion further contains a polymer dissolved in said liquid medium or attached to said GO or CFG.

7. The process of claim 1, wherein said CFG contains a chemical functional group selected from a polymer, S03H, COOH, NH2, OH, R'CHOH, CHO, CN, COCI, halide, COSH, SH, COOR', SR', SiR'3, Si(—OR'-)yR'3-y, R", Li, AlR'2, Hg—X, TIZ2 and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate, or a combination thereof.

8. The process of claim 1, wherein said dispersion further contains pristine graphene sheets and a weight ratio between said pristine graphene sheets and said GO or CFG sheets is from 1/10 to 10/1.

9. The process of claim 1, wherein said second heat treatment temperature is higher than 1,500° C. for a length of time sufficient for decreasing an inter-plane spacing $d_{002}$ to a value less than 0.36 nm and decreasing the oxygen content or non-carbon element content to less than 0.1% by weight.

10. The process of claim 1, wherein said liquid medium consists of water and/or an alcohol.

11. The process of claim 1, wherein said second heat treatment temperature includes at least a temperature selected from (A) 300-1,500° C., (B) 1,500-2,100° C., or (C) higher than 2,100° c.

12. The process of claim 1, wherein said dried layer of GO or CFG has a thickness no greater than 100 μm.

13. The process of claim 1, wherein said dried layer of GO or CFG has a thickness no greater than 50 μm.

14. The process of claim 1, wherein said dried layer of GO or CFG has a thickness no greater than 20 μm.

15. The process of claim 1, wherein said highly oriented graphene film has a thickness less than 50 μm.

16. The process of claim 2, wherein said highly oriented graphene film has a thickness less than 20 μm.

17. The process of claim 1, wherein said dispersion of GO is prepared by immersing a graphitic material in a powder or fibrous form in an oxidizing liquid in a reaction vessel at a reaction temperature for a length of time sufficient to obtain said GO dispersion wherein said graphitic material is selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof and wherein said GO has an oxygen content no less than 5% by weight.

18. The process of claim 1, wherein said dispersion of CFG is prepared by immersing a graphitic material in a powder or fibrous form in an oxidizing liquid in a reaction vessel at a reaction temperature for a length of time sufficient to obtain a graphene oxide dispersion wherein said graphitic material is selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof and wherein said graphene oxide has an oxygen content no less than 5% by weight and said graphene oxide is chemically functionalized.

19. The process of claim 1, wherein said step (b) includes feeding a sheet of a solid substrate material from a roller to a deposition zone, depositing a layer of GO or CFG dispersion onto a surface of said sheet of solid substrate material to form said GO or CFG dispersion layer thereon, drying said GO or CFG dispersion to form the dried GO or CFG layer deposited on said substrate surface, and collecting said GO or CFG layer-deposited substrate sheet on a collector roller.

20. The process of claim 1, wherein said first and/or second heat treatment temperature contains a temperature in the range of 300° C.-1,500° C. and the highly oriented graphene film has an oxygen content less than 1%, an inter-graphene spacing less than 0.345 nm, a thermal conductivity of at least 1,000 W/mK, and/or an electrical conductivity no less than 3,000 S/cm.

21. The process of claim 1, wherein said first and/or second heat treatment temperature contains a temperature in the range of 1,500° C.-2,100° C. and the highly oriented graphene film has an oxygen content less than 0.01%, an inter-graphene spacing less than 0.337 run, a thermal conductivity of at least 1,300 W/mK, and/or an electrical conductivity no less than 5,000 S/cm.

22. The process of claim 1, wherein said first and/or second heat treatment temperature contains a temperature greater than 2,100° C. and the highly oriented graphene film has an oxygen content no greater than 0.001%, an inter-graphene spacing less than 0.336 nm, a mosaic spread value no greater than 0.7, a thermal conductivity of at least 1,500 W/mK, and/or an electrical conductivity no less than 10,000 S/cm.

23. The process of claim 1, wherein said first and/or second heat treatment temperature contains a temperature no less than 2,500° C. and the highly oriented graphene film has an inter-graphene spacing less than 0.336 nm, a mosaic spread value no greater than 0.4, a thermal conductivity greater than 1,600 W/mK, and/or an electrical conductivity greater than 10,000 S/cm.

24. The process of claim 1, wherein the highly oriented graphene film exhibits an inter-graphene spacing less than 0.337 nm and a mosaic spread value less than 1.0.

25. The process of claim 1, wherein the highly oriented graphene film exhibits a degree of graphitization no less than 80% and/or a mosaic spread value less than 0.4.

26. The process of claim 1, wherein the highly oriented graphene film exhibits a degree of graphitization no less than 90% and/or a mosaic spread value no greater than 0.4.

27. The process of claim 1, wherein said highly oriented graphene film contains chemically bonded graphene planes that are parallel to one another.

28. The process of claim 1, wherein said GO or CFG dispersion is obtained from a graphitic material having a maximum original graphite grain size and said highly oriented graphene film is a poly-crystal graphene structure having a grain size larger than said maximum original grain size.

29. The process of claim 2, wherein said GO or CFG dispersion is obtained from a graphitic material having multiple graphite crystallites exhibiting no preferred crystalline orientation as determined by an X-ray diffraction method and wherein said highly oriented graphene film is a poly-crystal graphene structure having a preferred crystalline orientation as determined by said X-ray diffraction method.

30. The process of claim 1, wherein said step (e) of heat-treating induces chemical linking, merging, or chemical bonding of GO or CFG sheets, and/or re-graphitization or re-organization of a graphitic structure.

31. The process of claim 2, wherein said highly oriented graphitic film has an electrical conductivity greater than 5,000 S/cm, a thermal conductivity greater than 800 W/mK, a physical density greater than 1.9 g/cm3 a tensile strength greater than 80 MPa, and/or an elastic modulus greater than 60 GPa.

32. The process of claim 2, wherein said highly oriented graphitic film has an electrical conductivity greater than 8,000 S/cm, a thermal conductivity greater than 1,200 W/mK, a physical density greater than 2.0 g/cm3, a tensile strength greater than 100 MPa, and/or an elastic modulus greater than 80 GPa.

33. The process of claim 2, wherein said unitary graphitic film has an electrical conductivity greater than 12,000 S/cm, a thermal conductivity greater than 1,500 W/mK, a physical density greater than 2.1 g/cm3 a tensile strength greater than 120 MPa, and/or an elastic modulus greater than 120 GPa.

* * * * *